(12) United States Patent
Galasso et al.

(10) Patent No.: US 11,958,328 B2
(45) Date of Patent: Apr. 16, 2024

(54) METHODS AND APPARATUS FOR SUSPENSION SET UP

(71) Applicant: Fox Factory, Inc., Braselton, GA (US)

(72) Inventors: Mario Galasso, Sandy Hook, CT (US);
Joseph Franklin, Vancouver, WA (US);
Andrew Laird, Los Gatos, CA (US);
Charles Bass, Woodinville, WA (US);
Ryan Bavetta, Sunnyvale, CA (US)

(73) Assignee: Fox Factory, Inc., Duluth, GA (US)

( * ) Notice: Subject to any disclaimer, the term of this patent is extended or adjusted under 35 U.S.C. 154(b) by 250 days.

(21) Appl. No.: 17/003,746

(22) Filed: Aug. 26, 2020

(65) Prior Publication Data

US 2021/0023901 A1    Jan. 28, 2021

Related U.S. Application Data

(63) Continuation of application No. 16/147,200, filed on Sep. 28, 2018, now Pat. No. 10,759,247, which is a
(Continued)

(51) Int. Cl.
*B60G 17/018* (2006.01)
*B60G 17/015* (2006.01)
(Continued)

(52) U.S. Cl.
CPC ......... *B60G 17/018* (2013.01); *B60G 17/015* (2013.01); *B60G 17/017* (2013.01);
(Continued)

(58) Field of Classification Search
USPC .......................................................... 701/37
See application file for complete search history.

(56) References Cited

U.S. PATENT DOCUMENTS 435,995 A    9/1890  Dunlop
1,078,060 A  11/1913 Newman
(Continued)

FOREIGN PATENT DOCUMENTS

CN    101468587 A    7/2009
DE    1555311 A1     8/1970
(Continued)

OTHER PUBLICATIONS

Electronic Translation of DE3709447A1.
(Continued)

*Primary Examiner* — Tyler D Paige

(57) ABSTRACT

A method and apparatus are disclosed that assist a user in performing proper setup of a vehicle suspension. A user may utilize a device equipped with an image sensor to assist the user in proper setup of a vehicle suspension. The device executes an application that prompts the user for input and instructs the user to perform a number of steps for adjusting the suspension components. In one embodiment, the application does not communicate with sensors on the vehicle. In another embodiment, the application may communicate with various sensors located on the vehicle to provide feedback to the device during the setup routine. In one embodiment, the device may analyze a digital image of a suspension component to provide feedback about a physical characteristic of the component.

10 Claims, 38 Drawing Sheets

Related U.S. Application Data continuation of application No. 15/061,735, filed on Mar. 4, 2016, now Pat. No. 10,086,670, which is a continuation of application No. 14/446,179, filed on Jul. 29, 2014, now Pat. No. 9,278,598, which is a continuation of application No. 13/612,679, filed on Sep. 12, 2012, now Pat. No. 8,838,335.

(60) Provisional application No. 61/624,895, filed on Apr. 16, 2012, provisional application No. 61/533,712, filed on Sep. 12, 2011.

(51) Int. Cl.
| | |
|---|---|
| *B60G 17/017* | (2006.01) |
| *B60G 17/019* | (2006.01) |
| *B60G 17/04* | (2006.01) |
| *B60G 17/06* | (2006.01) |
| *B62J 45/41* | (2020.01) |
| *B62J 45/42* | (2020.01) |
| *B62K 25/04* | (2006.01) |
| *B62K 25/28* | (2006.01) |

(52) U.S. Cl.
CPC ......... *B60G 17/019* (2013.01); *B60G 17/04* (2013.01); *B60G 17/0424* (2013.01); *B60G 17/06* (2013.01); *B62J 45/41* (2020.02); *B62J 45/42* (2020.02); *B62K 25/04* (2013.01); *B62K 25/286* (2013.01); *B60G 2204/61* (2013.01); *B60G 2206/99* (2013.01); *B60G 2300/12* (2013.01); *B60G 2401/14* (2013.01); *B60G 2401/142* (2013.01); *B60G 2500/102* (2013.01); *B60G 2500/30* (2013.01); *B60G 2600/04* (2013.01); *B60G 2600/182* (2013.01); *B60G 2600/20* (2013.01); *B60G 2600/704* (2013.01); *B62K 2025/044* (2013.01); *B62K 2025/047* (2013.01); *B62K 2025/048* (2013.01); *G06T 2207/20021* (2013.01); *G06T 2207/30248* (2013.01); *G06T 2207/30252* (2013.01); *G06T 2210/22* (2013.01)

(56) References Cited

U.S. PATENT DOCUMENTS

| | | | |
|---|---|---|---|
| 1,307,502 A | 6/1919 | Martin |
| 1,313,763 A | 8/1919 | Thomas |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Ransom et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |

(56) References Cited

U.S. PATENT DOCUMENTS

| | | |
|---|---|---|
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,616,810 A | 10/1986 | Richardson et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Fakehara |
| 4,723,753 A | 2/1988 | Torimoto et al. |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Wander et al. |
| 4,773,671 A | 9/1988 | Inagaki |
| 4,786,034 A | 11/1988 | Heess et al. |
| 4,802,561 A | 2/1989 | Knecht et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,892,328 A | 1/1990 | Kurtzman et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A | 10/1991 | Iwata et al. |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le Gourvellec |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,297,045 A | 3/1994 | Williams et al. |
| 5,301,776 A | 4/1994 | Beck |
| 5,307,907 A | 5/1994 | Nakamura et al. |
| 5,310,203 A | 5/1994 | Chen |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,121 A | 2/1995 | Wolfe |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,445,366 A | 8/1995 | Shih et al. |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |

(56) References Cited

U.S. PATENT DOCUMENTS

| | | |
|---|---|---|
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordan et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,722,678 B2 | 4/2004 | McAndrews |
| 6,732,033 B2 | 5/2004 | LaPlante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,574 B2 | 6/2007 | Matsunaga et al. |

(56) References Cited

U.S. PATENT DOCUMENTS

| | | |
|---|---|---|
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | LaPlante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedei et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,157,629 B2 | 4/2012 | Yanke et al. |
| 8,191,964 B2 | 6/2012 | Hsu et al. |
| 8,201,476 B2 | 6/2012 | Miyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,322,497 B2 | 12/2012 | Marjoram et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,459,619 B2 | 6/2013 | Frinh et al. |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Laird et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |

(56) References Cited

U.S. PATENT DOCUMENTS

| | | |
|---|---|---|
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,029,172 B2 | 7/2018 | Galasso et al. |
| 10,036,443 B2 * | 7/2018 | Galasso ............... F16F 9/3264 |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 * | 12/2018 | Galasso ............... B60G 11/27 |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,591,015 B2 | 3/2020 | Galasso et al. |
| 10,697,514 B2 | 6/2020 | Marking |
| 10,718,397 B2 | 7/2020 | Marking |
| 10,737,546 B2 | 8/2020 | Tong |
| 10,933,709 B2 | 3/2021 | Shaw et al. |
| 11,162,555 B2 | 11/2021 | Haugen |
| 11,279,198 B2 | 3/2022 | Marking |
| 11,472,252 B2 | 10/2022 | Tong |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0120080 A1 | 6/2006 | Sipinski et al. |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0265144 A1 * | 11/2006 | Frolik ............... G01M 13/028 |
| | | 702/33 |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |

(56) References Cited

U.S. PATENT DOCUMENTS

| | | |
|---|---|---|
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0260372 A1 * | 11/2007 | Langer ............... G01M 17/04 701/31.4 |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 * | 7/2009 | Song ............... F16F 9/3221 715/810 |
| 2009/0200126 A1 | 8/2009 | Kondo et al. |
| 2009/0200760 A1 | 8/2009 | Gartner et al. |
| 2009/0236807 A1 | 9/2009 | Wootten et al. |
| 2009/0258710 A1 | 10/2009 | Ouatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 * | 1/2010 | Song ............... B62M 25/08 701/37 |
| 2010/0025946 A1 * | 2/2010 | Inoue ............... B60G 15/08 280/6.157 |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Miyama |
| 2010/0147640 A1 | 6/2010 | Jones et al. |
| 2010/0160014 A1 | 6/2010 | Galasso et al. |
| 2010/0164705 A1 | 7/2010 | Blanchard |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 * | 8/2011 | Galasso ............... F16F 9/3264 701/37 |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0166044 A1 | 6/2012 | Battlogg et al. |
| 2012/0181126 A1 | 7/2012 | De Kock |
| 2012/0221228 A1 | 8/2012 | Noumura et al. |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0090547 A1 | 4/2015 | Haugen |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0233442 A1 | 8/2015 | Noguchi |
| 2015/0289248 A1 | 10/2015 | Fukao et al. |
| 2016/0003320 A1 | 1/2016 | Kamakura et al. |
| 2016/0025178 A1 | 1/2016 | Kamakura et al. |
| 2016/0031506 A1 | 2/2016 | Lloyd et al. |
| 2016/0076617 A1 | 3/2016 | Marking |

(56) References Cited

U.S. PATENT DOCUMENTS

| | | | |
|---|---|---|---|
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0156300 A1 | 6/2018 | Sakai |
| 2018/0174446 A1 | 6/2018 | Wang |
| 2018/0208011 A1 | 7/2018 | Wigg et al. |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0092116 A1 | 3/2019 | Magnus et al. |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |
| 2020/0191227 A1 | 6/2020 | Laird |
| 2022/0252129 A1 | 8/2022 | Haugen |

FOREIGN PATENT DOCUMENTS

| | | |
|---|---|---|
| DE | 3613386 A1 | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007056313 A1 | 5/2009 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0306819 A2 | 3/1989 |
| EP | 0403803 A1 | 12/1990 |
| EP | 552568 A1 | 7/1993 |
| EP | 0735280 A2 | 10/1996 |
| EP | 0806587 A1 | 11/1997 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1662167 A1 | 5/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 2567839 B1 | 3/2019 |
| EP | 3786049 A1 | 3/2021 |
| EP | 3786049 B1 | 5/2023 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2282864 A | 4/1995 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | 084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2006065235 A2 | 6/2006 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2013066159 A1 | 5/2013 |
| WO | 2021066819 A1 | 4/2021 |

OTHER PUBLICATIONS

English language abstract for EP 0207409 (no date).
European Search Report, European Patent Application No. 14189773.6, dated May 4, 2015, 4 Pages.

(56) References Cited

OTHER PUBLICATIONS

EP Search Report for European Application No. 15163428.4, dated Jul. 3, 2017, 7 Pages.
"European Patent Office Final Decision dated Mar. 21, 2013", European Patent Application No. 10161906.2.
"European Search Report for European Application No. 10187320, 12 pages, dated Sep. 25, 2017 (dated Sep. 25, 2017)".
"European Search Report for European Application No. 12184150, 10 pages, dated Dec. 12, 2017 (dated Dec. 12, 2017)".
"European Search Report and Written Opinion, European Patent Application No. 13165362.8", dated Sep. 24, 2014, 6 Pages.
Nilsson, "Opposition Letter Against EP-2357098", Oct. 13, 2017, 7.
Shiozaki, et al., "SP-861-Vehicle Dynamics and Electronic Controlled Suspensions SAE Technical Paper Series No. 910661", International Congress and Exposition, Detroit, Mich , Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
European Examination Report for EP Application No. 11188520.8, 9 pages, dated Jul. 19, 2022.
European Examination Report for European Application No. 11275170.6, 6 pages, dated Oct. 20, 2022.
European Search Report for European Application No. 19155995, 11 pages, dated Aug. 28, 2019.
European Search Report for European Application No. 19206334.5, 6 pages, dated May 12, 2020 (dated May 12, 2020).
European Search Report for European Application No. 19212356.0, 8 pages, dated May 7, 2020 (dated May 7, 2020).
Machine translation DE3613386; Oct. 1986.
Machine translation EP 0403803; Dec. 1990.
Machine translation KR20100041679; Apr. 2010.
European Search Report for European Application No. 19157767, dated Oct. 16, 2019, 9 Pages.
European Search Report for European Application No. 21170685.8, dated Nov. 10, 2021, 8 Pages.
EP Search Report for European Application No. 21173940.4, dated Nov. 12, 2021, 9 Pages.
European Search Report for European Application No. 20187747, dated Nov. 18, 2020, 11 Pages.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
Grounds of Appeal, EP App. No. 11153607.4, Jun. 1, 2018, 28 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis for Claims Filed Jan. 15, 2023", European Patent Application No. 14189773.6, 2 Pages.
"Communication Re Oral Proceedings for European Application No. 10161906, dated Feb. 15, 2013 (dated Feb. 15, 2013)".
"European Search Report for European Application No. 09159949, 2 pages, dated Sep. 11, 2017 (dated Sep. 11, 2017)".
"European Search Report for European Application No. 09177128, 4 pages, dated Aug. 25, 2010 (dated Aug. 25, 2010)".
"European Search Report for European Application No. 10161906, 3 pages, dated Sep. 15, 2010 (dated Sep. 15, 2010)".
"European Search Report for European Application No. 11153607, 3 pages, dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11172612, 2 pages, dated Oct. 6, 2011 (dated Oct. 6, 2011))".
"European Search Report for European Application No. 11175126, 2 pages, dated Sep. 25, 2017 (dated Sep. 25, 2017)".
"European Search Report for European Application No. 11275170, 2 pages, dated Jan. 10, 2018 (dated Jan. 10, 2018)".
"European Search Report for European Application No. 12170370, 2 pages, dated Nov. 15, 2017 (dated Nov. 15, 2017)".
"European Search Report for European Application No. 13158034, 4 pages, dated Jun. 28, 2013 (dated Jun. 28, 2013))".
"European Search Report for European Application No. 13174817.0, 13 pages, dated Jan. 8, 2018 (dated Jan. 8, 2018))".
"European Search Report for European Application No. 13189574, 2 pages, dated Feb. 19, 2014 (dated Feb. 19, 2014)".
"European Search Report for European Application No. 15167426, 4 pages, dated Sep. 18, 2015 (dated Sep. 18, 2015))".
"European Search Report for European Application No. 16167306, 2 pages, dated Mar. 23, 2017 (dated Mar. 23, 2017)".
"European Search Report for European Application No. 17154191, 2 pages, dated Jun. 28, 2017 (dated Jun. 28, 2017)".
"European Search Report for European Application No. 17188022, 9 pages, dated Feb. 1, 2018 (dated Feb. 1, 2018))".
"European Search Report for EP Application No. 18154672, 3 pages, dated Aug. 28, 2018 (dated Aug. 28, 2018))".
"Notice of Intent to Grant EP Application 09159949.8 dated Nov. 14, 2019, p. 48".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Puhn, "How To Make Your Car Handle", HPBooks, 1981, 7 Pages.
Thum, Notice of Opposition to a European Patent, EP App. No. 14189773.6, Dec. 13, 2018, 49 Pages.
Thum, "Oppostion Letter Against EP2357098", Oct. 16, 2018, 39.
Thum, "Oppostion Letter Against EP2357098", Dec. 17, 2019, 25 Pages.
Waechter, et al., "A Multibody Model for the Simulation of Bicycle Suspension Systems", Vehicle System Dynamics, vol. 37, No. 1, 2002, 3-28.
Haller, E, EPO machine translation of CN 101468587 (A) Device with a suspension system and method for setting a suspension system, published on Jul. 1, 2009.
Kensuke, Suspension Control Device, machine translation of JPH05319054 (A), 1993-12-03 (Year: 1993).

\* cited by examiner

METHODS AND APPARATUS FOR SUSPENSION SET UP

CROSS-REFERENCE TO RELATED APPLICATIONS

This patent application is a continuation application of and claims the benefit of U.S. patent application Ser. No. 16/147,200, filed Sep. 28, 2018, entitled, "METHODS AND APPARATUS FOR SUSPENSION SET UP", by Galasso et al., assigned to the assignee of the present application, which is incorporated herein in its entirety by reference thereto.

The patent application Ser. No. 16/147,200 is a continuation application of and claims the benefit of U.S. patent application Ser. No. 15/061,735, filed Mar. 4, 2016, now U.S. issued U.S. Pat. No. 10,086,670, entitled, "METHODS AND APPARATUS FOR SUSPENSION SET UP", by Galasso et al., assigned to the assignee of the present application, which is incorporated herein in its entirety by reference thereto.

The patent application Ser. No. 15/061,735 is a continuation application of and claims the benefit of U.S. patent application Ser. No. 14/446,179, filed Jul. 29, 2014, now U.S. issued U.S. Pat. No. 9,278,598, entitled, "METHODS AND APPARATUS FOR SUSPENSION SET UP", by Galasso et al., assigned to the assignee of the present application, which is incorporated herein in its entirety by reference thereto.

The patent application Ser. No. 14/446,179 is a continuation application of and claims the benefit of patented U.S. patent application Ser. No. 13/612,679, filed Sep. 12, 2012, now U.S. issued U.S. Pat. No. 8,838,335, entitled, "METHODS AND APPARATUS FOR SUSPENSION SET UP", by Galasso et al., assigned to the assignee of the present application, which is incorporated herein in its entirety by reference thereto.

The application Ser. No. 13/612,679 claims benefit of U.S. Provisional Patent Application Ser. No. 61/533,712, filed Sep. 12, 2011, and U.S. Provisional Patent Application Ser. No. 61/624,895, filed Apr. 16, 2012, which is incorporated herein in its entirety by reference thereto.

The application Ser. No. 13/612,679 is related to U.S. patent application Ser. No. 13/022,346, which claims benefit of U.S. Provisional Patent Application Ser. No. 61/302,070, filed Feb. 5, 2010, and U.S. Provisional Patent Application 61/411,901, filed Nov. 9, 2010, and U.S. patent application Ser. No. 12/727,915, filed Mar. 19, 2010, which claims benefit of U.S. Provisional Patent Application Ser. No. 61/161,552, filed Mar. 19, 2009, and U.S. Provisional Patent Application Ser. No. 61/161,620, filed Mar. 19, 2009, and U.S. patent application Ser. No. 12/773,671, filed May 4, 2010, which claims benefit of U.S. Provisional Patent Application Ser. No. 61/175,422, filed May 4, 2009. Each of the aforementioned patent applications is herein incorporated by reference in its entirety.

BACKGROUND OF THE INVENTION

Field of the Invention

The invention relates generally to vehicle suspensions and, more specifically, to a system for adjusting operational characteristics of a vehicle suspension system.

Description of the Related Art

Vehicle suspension systems typically include a spring component or components and a damping component or components. Often, mechanical springs, like helical springs, are used with some type of viscous fluid-based damping mechanism, the spring and damper being mounted functionally in parallel. In some instances a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Despite efforts to educate product managers, retailers, and end consumers on the importance of proper initial vehicle suspension set up, it is evident at event support and trail side encounters that many vehicles such as mountain bikes and motorcycles are ridden with improper initial suspension settings. An important initial setting is suspension "sag," which is the measured distance a shock absorber compresses while the rider, preferably wearing intended riding gear, is seated on, e.g., a bicycle, motorcycle, or four-wheeled vehicle in a riding position compared to a fully extended suspension position. Suspension sag also applies to all-terrain vehicles (ATVs), trucks, and other vehicles equipped with a suspension. Getting the sag setting correct allows the wheels or vehicle suspension to react to negative terrain features (i.e., dips requiring suspension extension) without the entire vehicle "falling" into such terrain features. Often any attention that is paid to the initial sag setting is focused on the rear suspension, especially in motorcycle applications, but making sure that both the front and rear sag settings are correct is equally important.

Another important initial setting is the rebound damping setting for the rear and front vehicle suspensions. Rebound damping dissipates stored system spring energy after a suspension compression event and results in a controlled rate of return of the suspension to a more extended condition. Preventing the suspension from rebounding too quickly is an important aspect of the quality of vehicle suspension setup. In the case of rear suspension, an improper amount of rebound damping can result in the rear of the vehicle "kicking" off the ground and pitching the rider forward after encountering a bump or sharp compression obstacle, also known as "bucking." In the case of front suspension, an improper amount of rebound damping can cause impact to the rider's hands as the front suspension kicks back directly toward the rider. Conversely, preventing the suspension from rebounding too slowly is also an important aspect of the quality of vehicle suspension setup. An improper amount of rebound damping, where the amount of damping is too high, can result in the suspension not returning quickly enough to respond to the next bump in a series of bumps, ultimately causing the suspension to "ratchet" down into a compressed state. Such a "ratcheting" sequence is commonly referred to as suspension packing. Packing can result in the suspension being overly stiff due to retained compression through the middle to the end of a series of bumps, causing the back of the vehicle to kick off the ground and pitch the rider forward (in the case of the rear suspension) and causing the suspension to get overly stiff and steering geometry to get steep and unstable (in the case of the front suspension). Compression damping settings are similarly important.

As the foregoing illustrates, what is needed in the art are improved techniques for assisting the operator of a vehicle to prepare and adjust one or more operating parameters of the vehicle for an optimum riding experience.

SUMMARY OF THE INVENTION

One embodiment of the present disclosure sets forth a computer-readable storage medium including instructions that, when executed by a processor, cause the processor to perform a plurality of steps. The steps include receiving a weight value that indicates a load to be carried by the vehicle, receiving a digital image of the suspension component, and cropping the digital image to generate a portion of the digital image, where the portion of the digital image comprises a plurality of pixels associated with a shaft of the suspension component and an o-ring positioned to indicate a level of sag of the suspension component under the load. The steps further include analyzing, via an object recognition algorithm executed by a processor, the portion of the digital image to determine a location of the o-ring on the shaft of the suspension component, and determining an adjustment to the suspension component based on the location of the o-ring.

Another embodiment of the present disclosure sets forth a system for adjusting a suspension component on a vehicle. The system includes an image sensor, a display, a memory storing an application, and a processor coupled to the memory, the image sensor, and the display. The processor is configured to receive a weight value that indicates a load to be carried by the vehicle, receive a digital image of the suspension component, and crop the digital image to generate a portion of the digital image, where the portion of the digital image comprises a plurality of pixels associated with a shaft of the suspension component and an o-ring positioned to indicate a level of sag of the suspension component under the load. The processor is further configured to analyze, via an object recognition algorithm, the portion of the digital image to determine a location of the o-ring on the shaft of the suspension component, and determine an adjustment to the suspension component based on the location of the o-ring.

Yet another embodiment of the present disclosure sets forth a system for adjusting a suspension component on a vehicle. The system includes a display, a memory storing an application, and a processor coupled to the memory, and the display. The processor is configured to receive a weight value that indicates a load to be carried by the vehicle, determine a target pressure for an air spring of the suspension component based on the weight value, measure a loaded position of the suspension component, and determine an adjustment to the suspension component based on the loaded position.

In other embodiments, there is provided a vehicle damper comprising a piston and shaft telescopically mounted within a cylinder, wherein a portion of the shaft is visible when the damper is mounted on a vehicle and the vehicle is not in use, the vehicle damper further comprising a code for identifying the vehicle damper within an electronic database of vehicle dampers, and a member mounted on the visible portion of the shaft. The member adapted to be movable along the shaft by the cylinder during a compression of the damper, but which member retains a position on the shaft indicating the furthest movement of the cylinder during compression of the damper.

In yet other embodiments, there is provided a system that includes a shock absorber having a first member and a second member mounted movably relative thereto such that the shock absorber is positioned at or between an extended position and a compressed position. The system further includes a sensor configured to measure the position of the shock absorber, a memory for storing a plurality of sensor readings (e.g., digitally), a processor executing a program for calculating a force applied to the shock absorber based on a difference between a first position and a second position and a spring setting (i.e., target pressure) such that the force applied to the shock absorber causes the shock absorber to be compressed to a third position (i.e., proper sag position), and a user interface for displaying the spring setting to a user. The program calculates a rebound damping setting (and/or a compression damping setting) for the shock absorber based on the spring setting.

One advantage of the disclosed technique is that the device may use the physical characteristics of the suspension component and an intended load entered by the rider to automatically calculate target values for various settings of the suspension component that should result in a properly setup vehicle suspension. The device may also receive feedback, such as using images captured by the device, to determine whether the suspension should be adjusted from the target values in order to provide the correct result. Proper setup of a vehicle suspension helps create a more enjoyable experience for the rider.

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

For clarity, identical reference numbers have been used, where applicable, to designate identical elements that are common between figures. It is contemplated that features of one example embodiment may be incorporated in other example embodiments without further recitation.

DETAILED DESCRIPTION

Integrated damper/spring vehicle shock absorbers often include a damper body surrounded by a mechanical spring or constructed in conjunction with an air spring. The damper often consists of a piston and shaft telescopically mounted in a fluid filled cylinder. A mechanical spring may be a helically wound spring that surrounds the damper body. Various integrated shock absorber configurations are described in U.S. Pat. Nos. 6,311,962; 6,135,434; 5,044,614; 5,803,443; 5,553,836; and 7,293,764; each of which is herein incorporated by reference in its entirety.

Some shock absorbers utilize gas as a spring medium in place of, or in addition to, mechanical springs. Gas spring type shock absorbers, such as gas spring shock absorbers having integral dampers, are described in U.S. Pat. Nos. 6,135,434; 6,360,857; and 6,311,962, each of which is herein incorporated by reference in its entirety. U.S. Pat. No. 6,360,857, which is incorporated herein by reference in its entirety, shows a shock absorber having selectively adjustable damping characteristics. U.S. Pat. No. 7,163,222, which is incorporated herein by reference in its entirety, describes a gas sprung front shock absorber for a bicycle (i.e., a bicycle fork) having a selective "lock out" and adjustable "blow off" function.

The spring mechanism (gas or mechanical) of some shock absorbers is adjustable so that it can be preset to varying initial states of compression. In some instances the shock spring may comprise different stages having varying spring rates, thereby giving the overall shock absorber a compound spring rate varying through the stroke length. In that way, the shock absorber can be adjusted to accommodate heavier or lighter carried weight, or greater or lesser anticipated impact loads. In vehicle applications, including motorcycle and bicycle applications and particularly off-road applications, shock absorbers should be pre-adjusted to account for varying terrain and anticipated speeds and jumps. Shocks may also be adjusted according to certain rider preferences (e.g., soft to firm).

Figure 17:
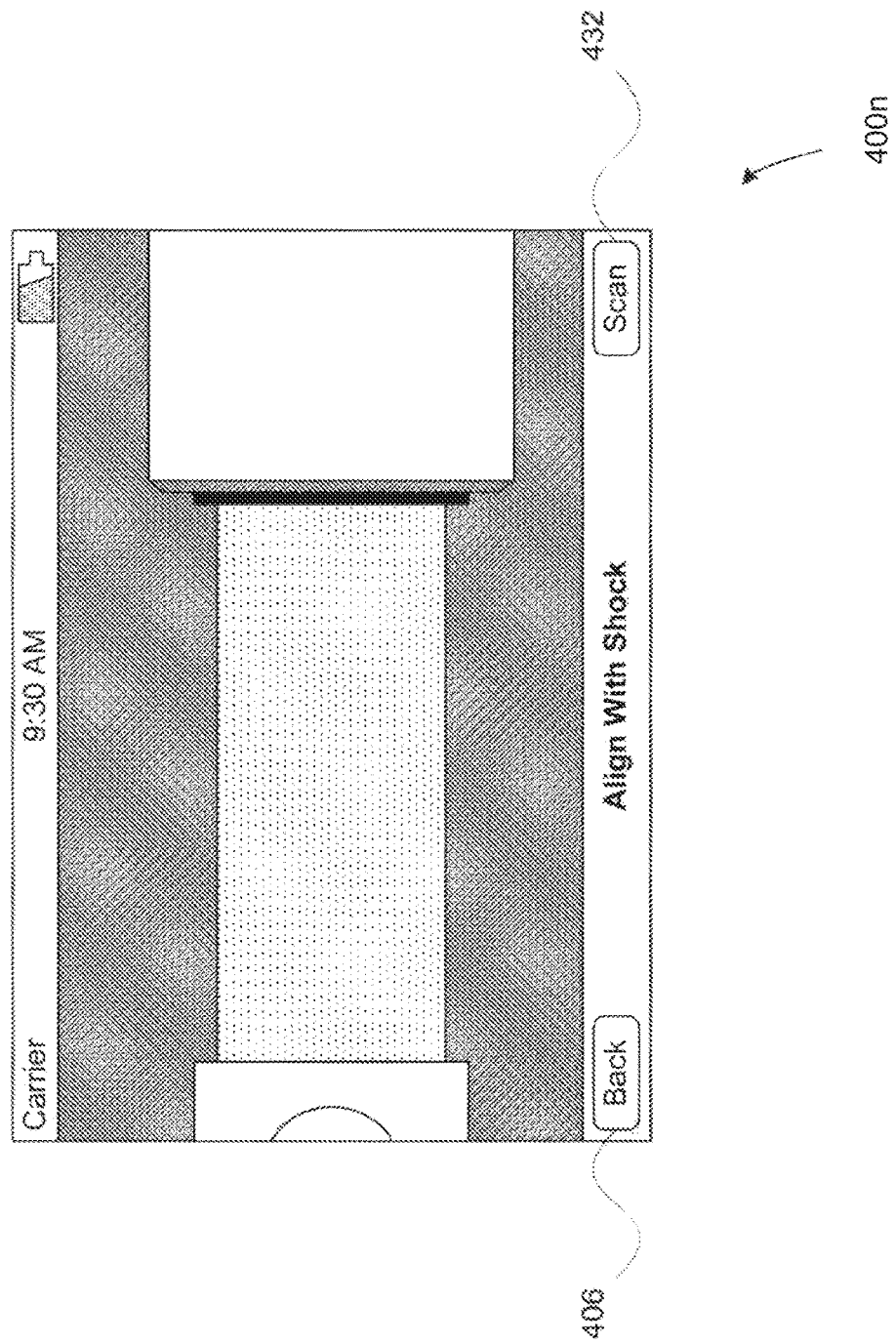
Figure 18:
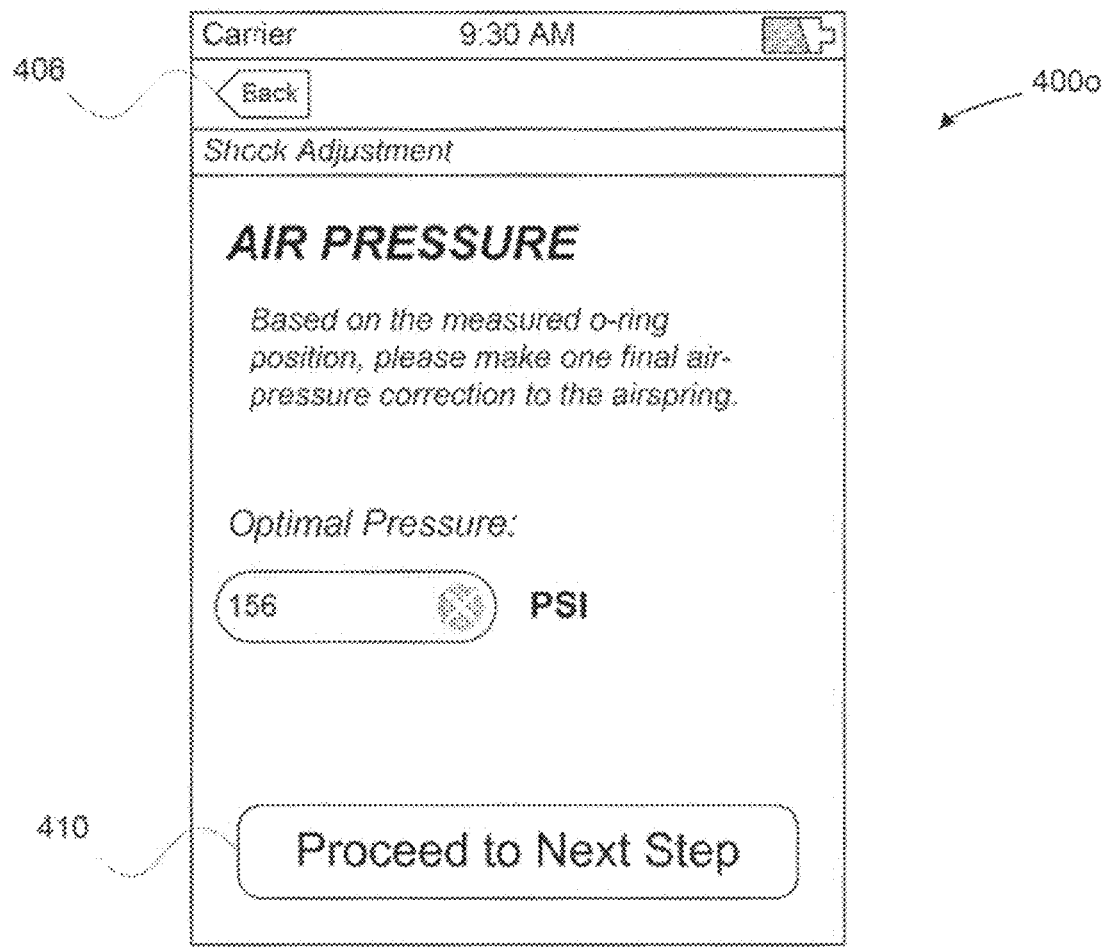
Figure 19:
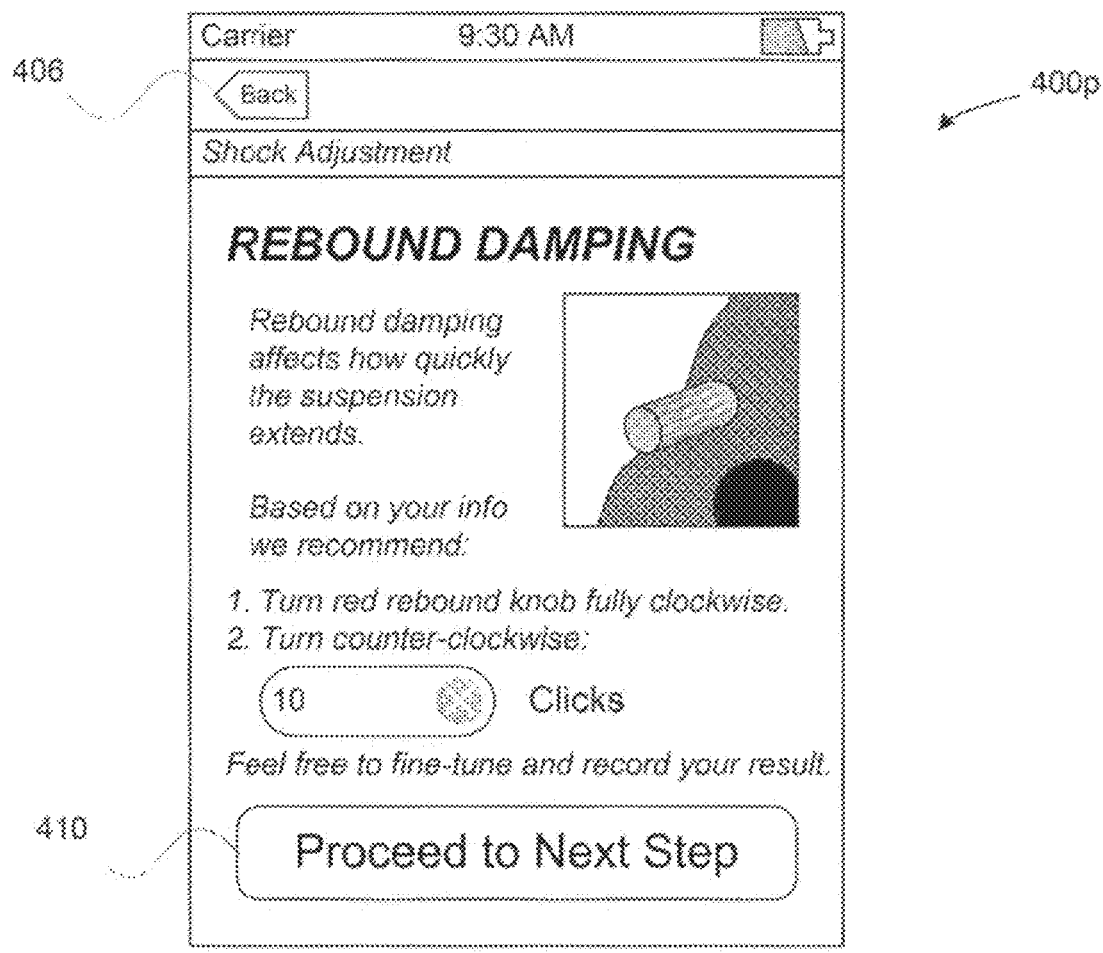

For example, a type of integrated damper/spring shock absorber having a gas spring is shown in FIG. 28 of U.S. Pat. No. 7,374,028 (hereinafter "028 patent"), which is incorporated by reference herein in its entirety. The shock absorber of FIG. 28 also includes an "adjustable intensifier assembly 510." The intensifier or reservoir accepts damping fluid from chamber 170 as the fluid is displaced from that chamber by the incursion of rod 620 into chamber 170 during a compression stroke of the shock. The intensifier valve assembly regulates flow of damping fluid into and out of the reservoir, and an embodiment of the valve assembly is shown in FIG. 17 of the '028 patent.

Although described herein with respect to a bicycle suspension system, the embodiments herein may be used with any type of suspended vehicle, as well as other types of suspension or damping systems.

Figure 1:
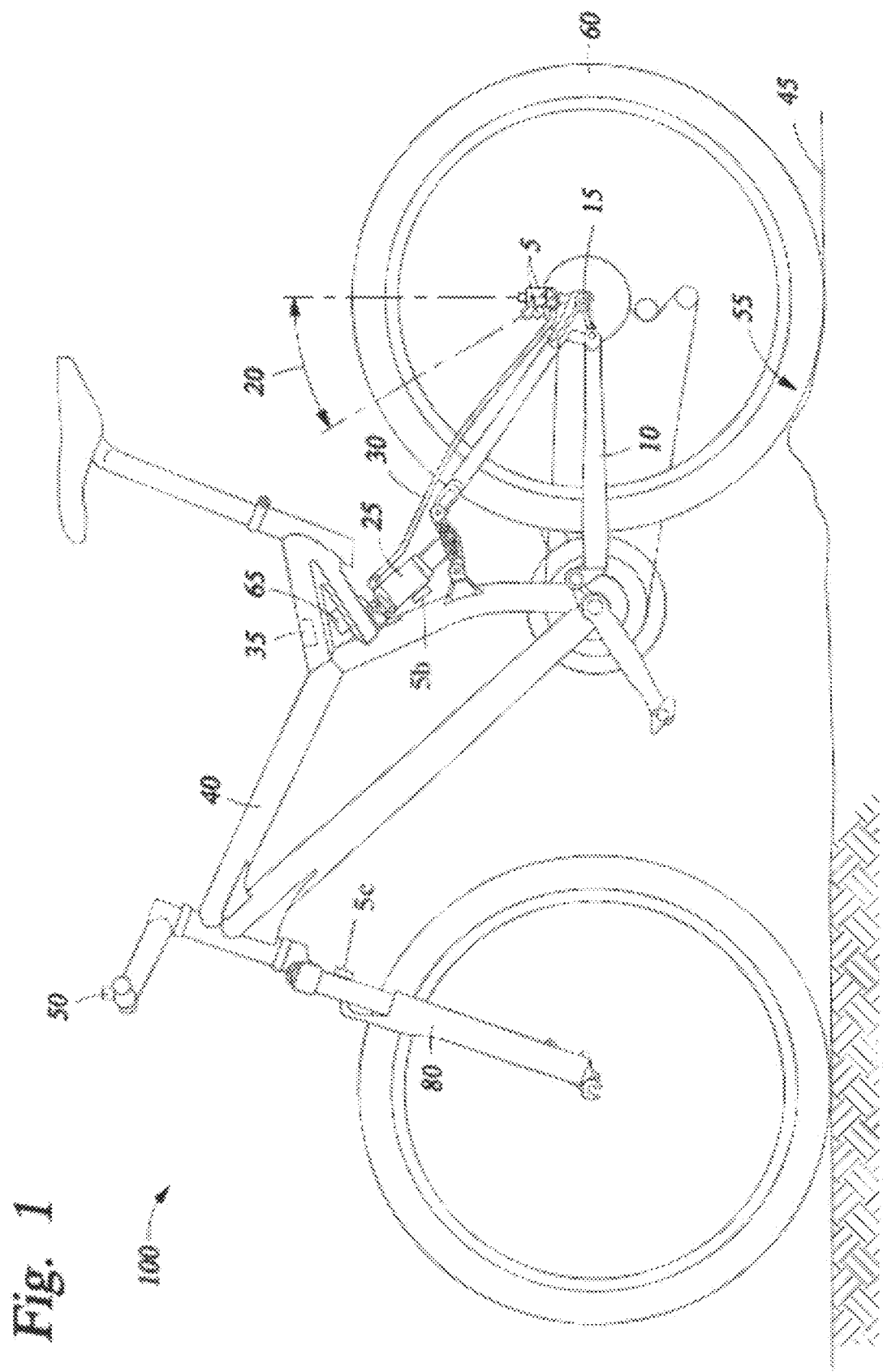
FIG. 1 shows a vehicle used to perform a setup routine, according to one example embodiment.

Referring to FIG. 1 herein, a vehicle, such as a bicycle, generally identified by reference numeral 100, comprises a frame 40 and front forks 80. In one embodiment, the frame 40 has a suspension system comprising a swing arm assembly 10 that, in use, is able to move relative to the rest of the frame; this movement is permitted by, inter alia, a rear shock absorber and/or damping assembly 25. The front forks 80 also provide a suspension function via a damping assembly in at least one fork leg. As such, the bicycle 100 shown in FIG. 1 is a full suspension bicycle (such as an ATB or mountain bike), although the embodiments described herein are not limited to use on full suspension bicycles. In particular, the term "suspension system" is intended to include vehicles having either a front suspension or a rear suspension (or both), and other systems wherein motion damping is included (such as for example vehicle steering dampeners or machine part motion dampeners).

In one embodiment, a sensor 5 may be positioned proximate a rear axle 15 of the bicycle 100 for sensing changes in terrain. As shown in FIG. 1, the sensor 5 is mounted on swing arm assembly 10 proximate the rear axle 15 of the bicycle 100. In one embodiment, the angular orientation of a sensor 5 sensing axis is movable through a range or angle 20 (and is shown in each of two positions of many possible positions), thereby allowing alteration of a force component sensed by the sensor 5 in relation to a force (vector) input into the rear swing arm 10. It is understood that the sensor 5 may be moved or mounted in any suitable configuration and allowing for any suitable range of adjustment as may be desirable. In some embodiments, the sensor 5 may include one, two, three or more sensing axes, which is useful for adjusting the sensitivity of the sensor 5 to various anticipated terrain and bicycle speed conditions. The bicycle speed affects the vector direction of a force input to the bicycle wheel for a constant amplitude terrain disparity 55 or "bump/dip." Varying size bumps and dips also affect the vector input angle to the wheel for constant bicycle speed. The movement of the swing arm 10 is however limited to a mechanically determined trajectory. In one embodiment, a second sensor 5b (also illustrated in FIG. 2A) may be coupled to the rear suspension, such as shock absorber and/or damper assembly 25, for measuring the operational characteristics of the rear suspension. In another embodiment, a third sensor 5c may be coupled to the front suspension, such as front forks 80, for measuring the operational characteristics of the front suspension. The operational characteristics may include at least one of position, velocity, acceleration, stroke, sag, compression, rebound, pressure, and temperature of the vehicle suspension.

The sensors, such as sensors 5, 5b, 5c, and a pedal force sensor (not shown), may be any suitable force or acceleration transducer (e.g. strain gage, wheatstone bridge, accelerometer, hydraulic cylinder, interferometer based, optical, thermal, acoustic or any suitable combination thereof). The sensors may utilize solid state electronics, electro-mechanical principles, or any other suitable mechanisms for monitoring the operational characteristics. In one embodiment, sensor 5 comprises a single-axis, self-powered accelerometer, such as for example ENDEVCO Model 2229C. The 2229C is a comparatively small device with overall dimensions of about 15 mm height by 10 mm diameter, and weighs about 4.9 g. The 2229C power is self-generated and therefore the total power requirements for the bicycle 100 are reduced; an important advantage, at least for some types of bicycle, where overall weight is a concern. In another embodiment, sensor 5 comprises the ENDEVCO 12M1A, which is of the surface-mount type. The 12M1A is a single-axis accelerometer comprising a bimorph sensing element which operates in the bender mode. This accelerometer is particularly small and light, measuring about 4.5 mm by 3.8 mm by 0.85 mm, and weighs about 0.12 g. In other embodiments, sensor 5 may be a tri-axial accelerometer, such as the ENDEVCO 67-100, which has overall dimensions of about 23 mm length and 15 mm width, and weighs about 14 g. Other sensors known in the art may be used with the embodiments described herein.

In one embodiment, the sensor 5 may be attached to the swing arm 10 directly, to any link thereof, to an intermediate mounting member or to any other portion or portions of the bicycle 100 as may be useful for purposes disclosed herein. In another embodiment, the sensor 5 may be attached to an un-sprung portion of the bicycle 100, such as for example the swing arm 10, and another sensor 35 (such as an accelerometer as described above) may be attached to a sprung portion of the bicycle 100, such as for example the frame 40. Data from each sensor can be registered relative to a common time datum, and suspension damping and/or spring effectiveness can be evaluated by comparing the data from the sensors on either "side" of the suspension unit. Sensors may be integrated with the vehicle structure and data processing system as described in U.S. Pat. Nos. 6,863,291; 4,773,671; 4,984,819; 5,390,949; 5,105,918; 6,427,812; 6,244,398; 5,027,303 and 6,935,157; each of which is incorporated herein by reference in its entirety. Sensors and valve actuators (e.g., electric solenoid, linear motor type, or rotary motor type) may be integrated herein utilizing principles outlined in SP-861-Vehicle Dynamics and Electronic Controlled Suspensions SAE Technical Paper Series no. 910661 by Shiozaki et al. for the International Congress and Exposition, Detroit, Mich., Feb. 25-Mar. 1, 1991, which is incorporated herein by reference in its entirety. Further, sensors and valves, or principles, of patents and other documents incorporated herein by reference, may be integrated into embodiments hereof, individually or in combination, as disclosed herein.

In one embodiment, the shock absorber 25 is operatively mounted between an unsprung portion of the bicycle 100, such as the swing arm 10 and rear axle 15, and a sprung portion of the bicycle 100, such as the frame 40. A representative example embodiment of the shock absorber 25 derives from a modification, as disclosed herein, of the shock absorber shown in FIG. 28 of the '028 patent.

Figure 2A:
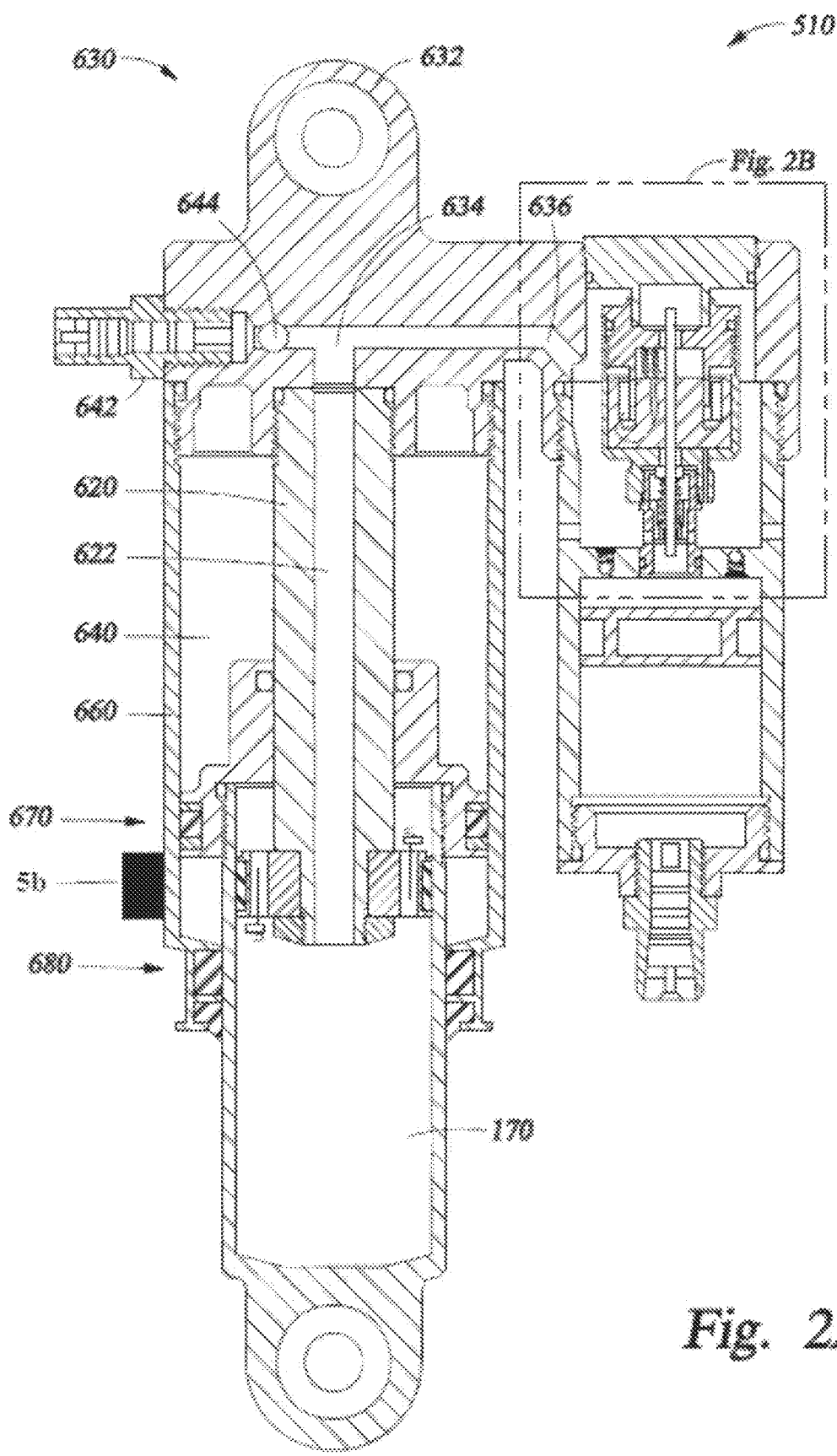
FIGS. 2A and 2B show a suspension component assembly, according to one example embodiment.
Figure 2B:
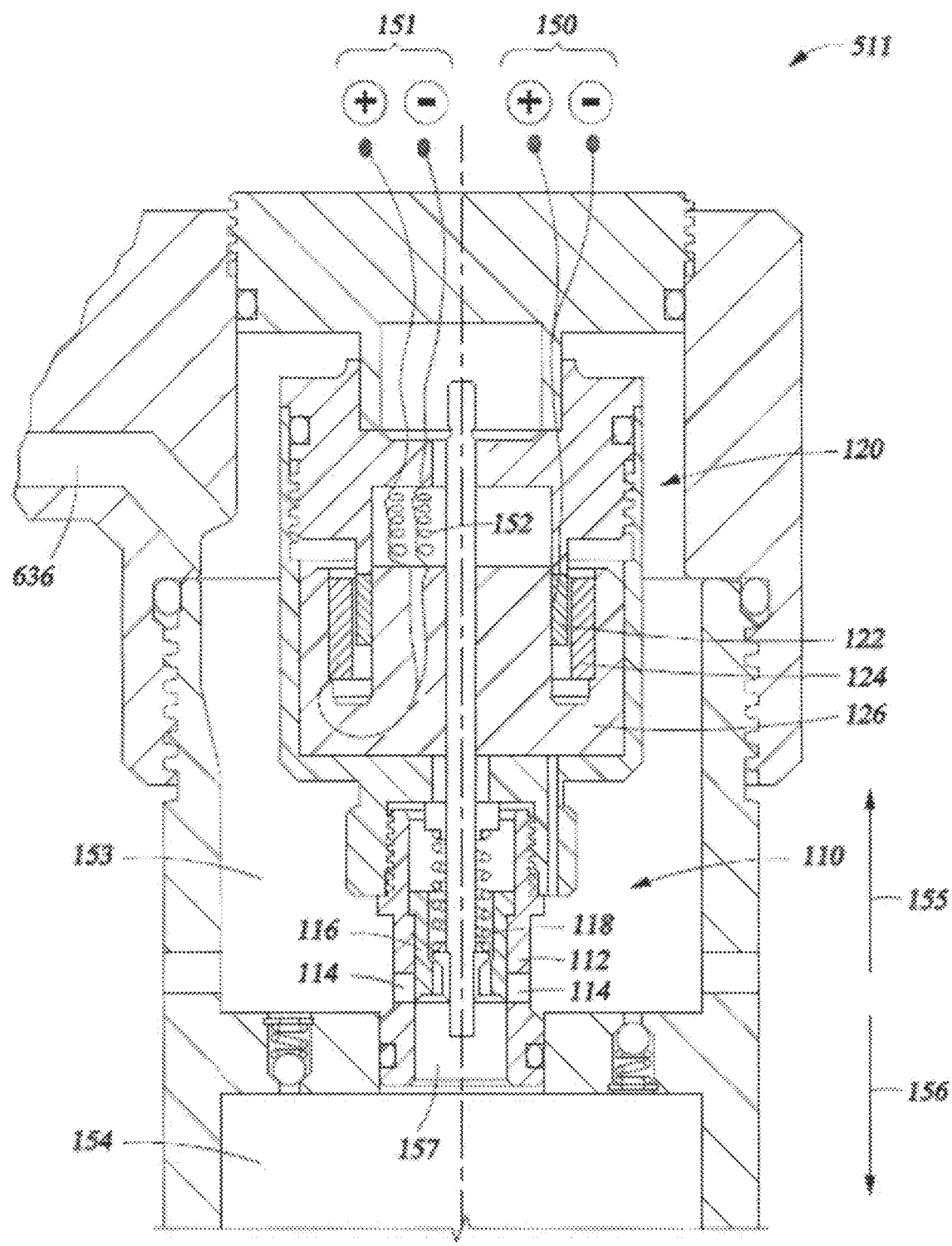

Referring to FIG. 2A herein, an intensifier assembly 510 is shown in conjunction with a damper assembly 630, which may be implemented as part of damping assembly 25 in vehicle 100. In one embodiment, the damper assembly 630 is disclosed in FIG. 28 of the '028 patent and includes similar reference numerals. FIG. 2B shows an embodiment of a valve assembly 511, such as an intensifier valve, for use with the embodiments disclosed herein. In one embodiment, the valve assembly 511 of FIG. 2B replaces, or may be used with, the "adjustable intensifier assembly" 510, as shown in FIGS. 16, 17, 28 and elsewhere in the '028 patent. The valve assembly 511 is operable in response to electric current and is capable of being modulated or throttled for selective full opening, closing and intermediate opening or "throttle" positions. The valve assembly 511 comprises a valve portion 110 and an actuator portion 120. The valve portion 110 may include a cylinder 112 with one or more variable orifices 114 and a member (e.g. piston) 116 that moves within the cylinder 112 to control the opening of the orifice(s) 114. The valve assembly 511 is in a closed position when the piston 116 is covering the orifice(s) 114. The valve assembly 511 is in an open position when the piston 116 moves away from the orifice(s) 114 such that at least a portion of the orifice(s) 114 is opened. In the open position, fluid may flow into the valve portion 110 and may flow out of the valve portion 110. The position of the piston 116 relative to the orifice(s) 114 varies the orifice opening and the flow through the valve portion 110. The valve assembly 511 may thus provide an output pressure in response to an input flow.

The valve portion 110 may also include a spring 118 that applies a force against the piston 116 to bias the piston 116 toward the closed position. Fluid pressure against the piston 116 may result in a force that exceeds the spring force causing the piston 116 to move and open the orifice(s) 114. The actuator portion 120 may also apply a force to the piston 116. The actuator portion 120 may advantageously be back drivable to permit the pressure term to push open the valve, for example, during the onset of a high shock event. One embodiment of the actuator portion 120 is a voice coil type linear actuator including a voice coil 122, a magnet 124, and a back iron 126. The back iron 126 is coupled to the piston 116 such that linear movement of the back iron 126 causes linear movement of the piston 116.

The actuator portion 120 may be controlled using a command such as a voltage command, for example, provided by drive electronics. A voltage command or signal to the actuator portion 120 causes current to flow through the coil 122, creating a magnetic field that applies a force to the magnet 124 and back iron 126. Different voltage commands may thus correspond to different amounts of force applied to the piston 116 in the valve assembly 511. In one embodiment, the signals and actuator are configured to move the valve completely between a full open ("unlocked") and a full closed position ("locked") thereby allowing the damper to move or substantially locking it; i.e., adjusting the damping rate of the damping assembly 630 between minimum and maximum respectively.

Although one exemplary valve 110 is shown, those skilled in the art will recognize that other types of valves may be used. Although the exemplary actuator 120 is a voice coil type linear actuator, those skilled in the art will recognize that other types of actuator technologies may be used. For example, the sensors, switches, controllers, actuators and other operative elements hereof may comprise optical circuitry and as such the power source may comprises an optical (or other electromagnetic) generator such as a "LASER" and wiring and circuits used herein may comprises fiber optic and optic circuitry including Bragg grating technology and other suitable "electrical equivalents." The elements hereof may be operable in whole or in part based on sonic wave or microwave transmission and suitable waveguide technology may be employed. An operation of an intensifier valve that may be used with the embodiments described herein is disclosed in U.S. Pat. No. 7,299,112; which is incorporated herein by reference in its entirety.

It should be noted that voice coil 122 and magnet 124 are interchangeable such that the voice coil may be either 122 or 124 and the magnet may be the other of 122 and 124, respectively. The voice coil 122 or 124 responds to input current from the power circuit (e.g. position control circuit or other suitable electrical input as described herein) and, therefore, input wiring is desirable. The input wiring and terminals for the 122 version of the voice coil is shown at 150. The input wiring and terminals for the 124 version of the voice coil is shown at 151 and includes windings 152 to accommodate extension and contraction of the throughput wires 152 during operation of the valve assembly 511.

The valve assembly 511 is shown in a closed or downward 156, position. As such, piston 116 fully obstructs orifices 114 thereby preventing fluid from flowing from damper assembly 630, through channel 636, into upper chamber 153, through orifice 114, through valve outlet 157 and into floating piston compensator chamber 154. When current of an appropriate magnitude is applied to the voice coil 122 or 124, the magnet electromagnet combination of 122 and 124 causes the back iron 126, and correspondingly the valve piston 116, to move upward 155 in an amount proportional to the voice coil input. Such upward 155 movement is against spring 118, which biases the valve piston 116 downward 156 (i.e. toward closed) and, therefore, when the voice coil input balances with the force of spring 118, movement of the piston 116 will stop and the valve assembly 511 will be correspondingly throttled.

In operation, the sensor 5 (and/or sensors 5b, 5c, 35) puts out a voltage corresponding to an input force. The outputs from sensors 5, 5b, 5c, 35 may be reconciled in a controller or processor 65 (described in greater detail below) that implements an algorithm for weighting their respective inputs and generating a resulting singular command or signal based on a predetermined logic. In one embodiment, the sensor 5 senses an input force along the prescribed range or axis 20. A bump in the terrain 45 typically exerts a force on a tire/wheel 60 of the bicycle 100. The angle of the resolved force relative to the tire/wheel 60 is typically normal (substantially) to the tire/wheel 60 at the point of impact. That force then imparts a component of the impact to the axle 15 as dictated by the trajectory of the swing arm linkage 10. That component can be sensed by the sensor 5 at a magnitude corresponding to the orientation of the sensor range or angle 20. The sensor axis 20 orientation can be adjusted to make the sensor 5 more or less sensitive (by imparting more or less of the impact to the sensor range or axis 20) to bumps and dips in the terrain 45.

It is envisaged that there are various ways the remote lock/unlock function of the rear shock absorber 25 and/or front shock absorber 80 may be provided on the bicycle 100. In one embodiment, remote lock/unlock may be entirely automatically controlled by a controller 65 in response to the input from the sensors 5, 5b, 5c and/or 35 when the bicycle 100 is in use. Optionally, the user may be able to override and/or adjust this automatic control using a device 50. In one embodiment, the remote lock/unlock of the rear shock absorber 25 and/or front shock absorber in fork 80 may be entirely controlled at the user's discretion using the device 50; in such an embodiment, the sensors 5, 5b, 5c and/or 35 need not be provided on the bicycle 100 and the user locks and unlocks the suspension system according to his or her own preferences at the time.

In one embodiment, device 50 comprises a digital user interface device provided with buttons and/or a touch screen that enables the user to adjust the damper assembly 630 at will. The device 50 may comprise a suitable GPS (global positioning system) unit, bicycle computer, heart rate monitor, smart phone, personal computer, or cloud-connected computer, and may further comprise connectivity to a network such as the Internet. The device 50 may send and receive data via cell phone bands, satellite bands, or other suitable electromagnetic frequencies to connect with other computer networks for the sending and or receiving of data, wherein the data may be received by and transformed by an outside computing machine and transmitted to the device 50 in an altered form or in a new form corresponding to the result of the outside machine transformation. The functionality of the device 50 may be incorporated into performance recording devices and/or digital user interfaces such as, but not limited to, the Garmin® EDGE series of devices and smart phones such as the Apple® iPhone or Motorola® phones including the Android® Operating System.

Some or all components of embodiments described herein, including sensors, switches, processors, controllers, shock absorbers, intensifier assembly, and/or valve assembly, may be interconnected or connected by wired or wireless communication. The components may be connected to a network, such as a wide area network (WAN), local area network (LAN), or the Internet, and configured to implement communications via Bluetooth, Wi-Fi, ANT (i.e., Garmin low power usage protocol), or any other suitable power or signal transmitting protocol. In some embodiments, the components should ideally communicate wirelessly with controller 65. As the controller 65 receives the input signals from sensors 5 (as well as 5b, 5c, 35, etc.) the controller 65 responds to those signals by adjusting the damping rate of the damper assembly 630.

In one embodiment, the controller 65 takes a derivative (i.e., differentiation) of the suspension compression and/or extension acceleration to determine the rate of change of acceleration for forecasting and implementing adjustment of the valve assembly 511 or for determining a data rate or sample density required to adequately represent current suspension behavior. For example, if a bump 55 is encountered, followed immediately by a dip, it may be desirable to have the rebound of the tire into the dip occur very rapidly. If the valve assembly 511 were opened to an intermediate state as determined by the controller 65 and the controller determines that a bump has been followed by a large magnitude reversal of the derivative of the acceleration (i.e., indicated by the sensor 5), then the controller 65 may direct the power source to fully open the valve assembly 511 to allow the maximum rebound velocity. It is noted that embodiments herein of shock absorber/damping assembly 630 and related systems are equally applicable to vehicle front forks. Further, it is contemplated that the vehicle may include both shock absorbers and front forks, both of which having some or all of the features disclosed herein.

Figure 3:
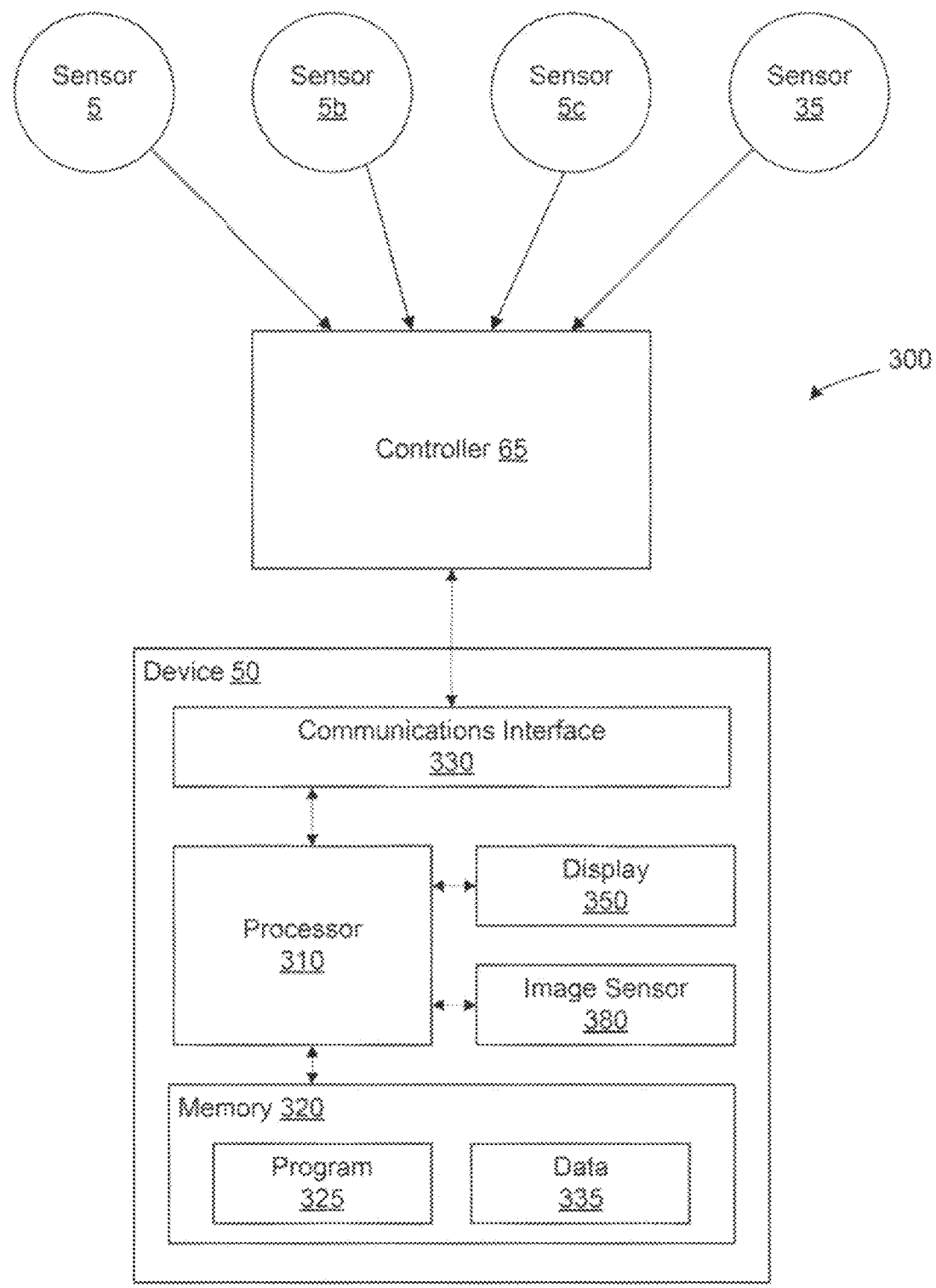
FIG. 3 illustrates a suspension setup system that assists a user in proper setup of the vehicle suspension, according to one example embodiment.

FIG. 3 illustrates a suspension setup system 300 that assists a user in proper setup of the vehicle suspension, according to one example embodiment. The system 300 enables a user to set up a vehicle 100 (such as vehicle 100 described above) equipped with one or more sensors (such as sensors 5, 5b, 5c, 35 described above), a processor or controller 65, and a device 50. An operator or user, such as a rider of the vehicle 100, may use the system 300 according to the embodiments described herein. In one embodiment, the vehicle 100, such as a bicycle, is equipped with the device 50 comprising at least a memory 320 storing a program 325 that implements an algorithm for setting up the suspension of the vehicle 100, and a processor 310 for executing the program 325. In one embodiment, the device 50 includes a communication interface 330 to communicate with controller 65. Communication interface 330 may be a wireless network interface, a near-field communication interface, or any other technically feasible communication interface. Device 50 may also include a display 350 used to display a graphical user interface to a user and an image sensor 380 that enables live video or images to be captured by the device 50 and stored in memory 320. In one embodiment, display 350 comprises a touch-sensitive LCD screen that may be used both for display of the user interface and for receiving input from the user.

In one embodiment, the device 50 captures data 335 from the sensors in the memory 320 for processing by program 325. The data 335 may include suspension component relative position data (e.g., inches of compression or full extension or full compression or any suitable combination of such data) and/or other operational characteristics/features of the vehicle 100 that are measured by the sensors. The raw sensor data may be communicated to the controller 65 via wired and/or wireless communication, and the controller 65 may process the raw sensor data and communicate the processed data 335 to device 50 via, for example, an industry standard low power wireless protocol. The program 325 instructs the user on what adjustments to make to improve the vehicle suspension setup and/or to describe the current performance of the vehicle suspension system. In one embodiment, the user may use the device 50 to adjust one or more components of the vehicle 100, automatically, manually and/or remotely, wired and/or wirelessly, directly, manually and/or indirectly (such as via the controller 65) during and/or after operation of the vehicle 100.

In one embodiment, the sensors are mounted to vehicle suspension components, such as the front forks 80 of bicycle 100 illustrated in FIG. 1. The sensor may be coupled to the vehicle 100 and may be operable to measure an operational characteristic of a vehicle component. In one embodiment, the sensors may be directly coupled to the vehicle components for direct measurement of each component's operational characteristics. In another embodiment, the sensors may be coupled to portions of the vehicle 100 apart from the vehicle components and may be operable for indirect measurement of each component's operational characteristics. In yet another embodiment, the sensors may be positioned at any location relative to the vehicle 100 and may be operable to measure an operational characteristic of the vehicle 100 directly or indirectly (e.g. inferred from the position of a vehicle component), such as the position of the vehicle suspension linkage, or the sprung versus un-sprung portion of the vehicle component, for example. The sensors are used to determine the position, velocity, and/or acceleration of the suspension components (raw sensor data is used to calculate such parameters within the controller 65). Again, the sensors may be linear potentiometers, string potentiometers, contact or non-contact membrane potentiometers, rotary potentiometers (such as if used on a linkage fork or a rear suspension linkage), accelerometers, 3D global position sensors ("GPS"), pressure sensors (for measuring the air spring or coil spring compression), and/or other type of sensors. These sensors may communicate either wired or wirelessly to the controller 65 to communicate the sag position of the vehicle suspension or any other suitable data. In one embodiment, the data sampling rate for the sensors is about 500 Hz to allow sufficient sampling and resolution of the vehicle suspension movement during operation.

In one embodiment, the controller 65 is relatively small (about 2".times.3-3.5".times.0.5-0.625") and lightweight so as to not negatively impact the user of the vehicle 100. The controller 65 need not literally "control" anything but rather may cull data and send the result to the device 50 for processing. The controller 65 may contain one or more of the following major components: a low power microprocessor, a wireless communication chip (such as ANT+, Bluetooth, and/or Wi-Fi 802.11n), a battery, and flash memory. The controller 65 may also have other sensors on board such as a GPS, a compass, an accelerometer, an altimeter, and/or an air temperature sensor. The controller 65 may also have one or more external features such as multi-color LED's to communicate basic state of operation and battery charge to the user and buttons to toggle power and start/stop data logging. The controller 65 may also have an external mini USB connector to connect to a computer or other external device for uploading of data and charging the battery as well as external connectors to connect to any wired sensors.

In one embodiment, the controller 65 may record and evaluate the vehicle suspension data in real time. The controller 65 may analyze parameters like sag (static ride height), rebound and compression speed, top out and bottom out events. Then, after analysis is complete, the controller 65 may communicate the results of the analysis with the device 50. Because there are many user interface devices that already have ANT+ and/or Bluetooth built-in (e.g. Garmin® GPS, power meters, Apple® iPhone, etc.) it is contemplated that certain embodiments will be compatible with these protocols. These 3rd party user interface devices generally have large displays with a developed GUI and user navigation method via any or all of buttons, joystick, touch screen, etc. The built-in wireless capabilities are ideal for low density data transmittal, but are not well suited for high speed data acquisition (because low power wireless data rates are generally limited). By leveraging the existing device display and GUI capabilities, the applicability of the system is increased. In one embodiment, the device 50 is programmed with a data template or templates suitable for filling with data and/or calculations/suggestions from the controller 65. In another embodiment, the device 50 is programmed with input templates for facilitating user input of suspension model, user weight, vehicle type, etc. as may be useful in aiding the controller 65 to look up corresponding parameters. The controller 65 will communicate to the device 50 selected data or calculations (e.g. graphical, tabular, textual or other suitable format) to display to the user, such as suggestions for adjusting spring preload, air spring pressure (to adjust sag), rebound damping setting, compression damping setting, bottom out damper setting, etc. Communication will also work in reverse to allow the user to enter data, such as model of suspension, rider weight, etc., in the device 50 which will relay the information to the controller 65. From such model information the controller 65 will look up model relevant parameters and use those to aid in calculating suggestions or for processing raw sensor data.

In one embodiment, the controller 65 functions as a data receiver, processor, memory and data filter. The controller 65 receives high frequency (high sampling rate) data from the suspension sensor(s). Because current user interface devices, particularly those using wireless protocols, may not be capable of high enough data rates to directly monitor the suspension sensors, the controller 65 may act as a high data rate intermediary between the suspension sensors and the device 50. In one embodiment, the controller 65 is configured to prompt and accept high sampling rate data from the suspension sensors. The controller 65 then stores the data and processes selected data at selected intervals for transmission to a user interface of the device 50. In other words the controller 65 pares the effective data rate and makes that pared data transmission to the user interface in real time. Additionally, the controller 65 stores all un-transmitted data for later analysis if desired. The controller 65 can later be plugged into a computer system, such as a home computing device or laptop via a USB pigtail or dongle device. The controller 65 may also preprocess data and generate user friendly viewing formats for transmission to the user interface of the device 50. The controller 65 may calculate data trends of other useful data derivatives for periodic "real time" (effectively real time although not exact) display on the user interface of the device 50.

In one embodiment, each vehicle 100 suspension component is equipped with a position sensor for indicating the magnitude (or state) of extension or compression existing in the vehicle 100 suspension at any given moment. As the suspension is used over terrain, such a sensor will generate a tremendous amount of data. Relatively high sampling rates are needed to capture meaningful information in devices operating at such high frequencies. For example, in one embodiment, a suitable telescopic tube of the vehicle 100 suspension may be equipped or fitted with two piezoelectric sensors. One of the piezoelectric sensors is a high frequency exciter which is configured on the tube such that it (substantially) continuously induces impacts to a wall of the tube. In lay terms, the sensor thumps or pings the tube wall on a continual basis. The second piezoelectric sensor is an accelerometer fixed or configured with the tube wall so as to monitor vibration of the tube wall. The frequency of the exciter is intentionally set well outside any resonant mode of the suspension tube as it travels through its operational suspension stroke. In one embodiment, a sensing frequency of the monitor is selected to coincide (substantially) with at least one resonant mode range of the tube as it travels through its operational stroke.

The aforementioned exciter and monitor are calibrated, in conjunction with the controller 65, so that values for resonant frequencies (in a selected mode or modes) of the suspension tube (or other suitable and variably "ringing" suspension component) are correlated with axial extension/compression of the suspension containing or including the tube. Such correlation data is stored with the controller 65 for use in real time calculation of axial suspension position based on real time input from the suspension resonant frequency monitor. The tube will tend to resonate regardless of the exciter frequency so by monitoring the change in resonant frequency or tube "ringing", with the monitor, the axial position of the suspension can be derived within the controller 65.

In one embodiment, the exciter and monitor act on and measure resonance with a cavity of the vehicle 100 suspension wherein cavity resonance versus axial suspension displacement is calibrated and correlated for use in the controller 65. In another embodiment, magnetic flux leakage of a suspension component, or magnetic imposition of current in a surrounding conductive structure, is correlated with axial suspension displacement. In yet another embodiment, optics may be used (e.g. Doppler effect) to measure displacement. In still another embodiment, a magnet is affixed to one portion of the suspension and a conductor is affixed to a relatively movable portion of the suspension so that when the suspension moves axially the relative movement between the magnet and the conductor generates a changing current of flux in the arrangement (and that can be correlated with axial movement). In another embodiment, sonic or ultrasonic waves are used to excite a portion of the suspension and the changing reflective sonic signals are monitored to determine axial disposition of the suspension.

In one embodiment, vehicle suspension components include scan compatible identification codes (e.g., bar codes or QR codes) specifying at least model type and possibly including details including performance specifications. The scan compatible identification codes may also specify other manufacture details such as lot, factory source, build date, inventory numbers, invoice or tracking numbers, subassembly/assembly numbers, etc. In one embodiment, the codes and/or data are included on a chip embedded in the suspension, such as an active or passive radio frequency identification ("RFID") tag. The controller 65, which may include an RFID tag reader, detects the chip and, based on the data received there from, proceeds to configure, or suggest configuration for, the vehicle suspension.

In one embodiment, the controller 65 and/or device 50 operates in a setup mode where rider input weight and suspension product data are used to suggest initial spring preload and damper settings for the vehicle suspension components. The controller 65 and/or device 50 may also operate in a ride mode wherein suspension movement (e.g. average travel used versus available, portion or range of travel used, number and severity of bottom out or top out events) is monitored and used in conjunction with the rider and suspension data to suggest changes to the suspension setup that better utilize or maximize usage of the suspension capabilities. In another embodiment, the controller 65 and/or device 50 monitors compression range of the suspension to determine whether or not the suspension is setup for optimal use of its range over a given terrain 45. Too many top out events or bottom out events, or operation generally over only a portion of the available range, will indicate a possible need for adjustment to the spring pressure and/or damping rate, and the controller 65, upon calculating such range usage, sends an appropriate suggestion to the device 50, which is displayed to the user. In one embodiment, a GPS unit transmits real time GPS data to the controller 65 and such data is overlayed or paired with corresponding suspension data along an elapsed (or relative sequence) time synchronous data marker (or other suitable common data marker or "datum" type).

In one embodiment, a rebound setting can be automatically achieved by utilizing the air spring pressure or coil spring preload needed to achieve proper sag. The rebound setting is then achieved via feeding the air spring pressure for an air shock, or an oil pressure signal for a coil shock, down the damper shaft to a pressure sensitive damping valve at the damper shaft piston. Rebound damping requirements will vary depending on the stiffness of the suspension spring. A stiffer (or softer) spring normally indicates more (or less) rebound damping as a requirement. In one embodiment, a rebound damper setting is calculated from the sag calculation spring setting recommendation. In one embodiment, there is an external rebound adjustor to make incremental changes from the predetermined setting to account for varied terrain/conditions, and/or riding style and preference.

In one embodiment, an initial sag setting can be automatically set and facilitated by having a position valve within the shock for a given length bleed off air pressure until a specific sag level is achieved. Each shock stroke would have a specific length of sag/position valve. The user would pressurize their shock to a maximum shock pressure of, for example, 300 psi or so. The actual max number is not important at this point. The idea is to over pressurize the shock beyond any reasonable properly set sag pressure. The user then switches the shock to be in setup or sag mode and sits on the bike. The shock will bleed air from the air spring until the position valve encounters a shut off abutment which thereby shuts the bleed valve. In one embodiment, the device 50 or controller 65 "knows" a vehicle suspension component is extended beyond a proper sag level and a an electrically actuated valve (or other type of remote actuated valve) is opened to bleed air pressure from the air spring in a controlled manner until the proper predetermined sag level is reached, at which point the valve automatically closes and the shock opts itself out of sag mode. Alternatively, the user can switch the sag set up mode off upon reaching a proper sag setting. When in a normal riding mode, more pressure can be added to the air spring or pressure can be reduced from the air spring to accommodate different rider styles and or terrain 45. This auto sag feature can be achieved electronically as well, by having a position sensor in the shock, and the shock model data allowing the controller 65 to adjust spring preload (e.g. air pressure) appropriately for the given model (as determined by the controller 65 in a query). An electronically controlled pressure relief valve is utilized to bleed off air spring pressure until the sensor determines the shock is at its' proper sag. The pressure relief valve is then directed to close and proper sag level is achieved.

In one embodiment, the system 300 can be utilized by integrating certain data collection sensors to both assist in the initial setup of the vehicle and to provide hints on how to tweak the vehicle 100 suspension system beyond an initial setup. The sensors communicate with the controller 65. Data (e.g. model, specifications) corresponding to all possible suspension products that may interface with the controller 65 would be stored in the controller 65 so when one or another of those products is plugged in, or booted up if wirelessly connected, the controller 65 would know lengths, travels, external adjustment features etc. For each product connected to the controller 65, the controller 65 (or device 50) would then walk the user through a proper setup routine, starting with sag for example, using the user interface provided by device 50. The user would sit on the bike and the rider sag measurement for the fork and shock would be displayed on the device 50 for example. The controller 65 will know what product it is trying to get adjusted properly and will make pressure recommendations for the user to input to the shock or fork. The user then sits on the bike again and, in this iterative and interactive process, will arrive at initial sag setting for the fork and shock product being used.

In a more elaborate system, the controller 65 will "know" what pressure is in the fork and shock, and will make rebound recommendations based on those settings. In a simpler form, the controller 65 will ask the user to input their final sag attaining pressures and will then make rebound recommendations based on the product and pressures. The controller 65 will also make compression damping setting recommendations based on the product connected to the controller 65. The user then goes out and rides the vehicle. The controller 65 will transfer to data logging mode once the bike is being ridden or in a simpler form when the user puts the system into ride mode. The controller 65 will log and save bottom out events, average travel used, identify too quick or too slow rebound events, etc. If average travel is more than a specified amount, the controller 65 will make recommendations on settings to have the system respond better in the stroke. If the average travel used in less than a specified amount the controller 65 will make recommendations on settings to utilize more travel. Full travel events will be evaluated versus the average travel used data and make recommendations on how to reduce or increase the amount of full travel events. Computer (PC/laptop) software may be utilized so the data logged can be downloaded to a computer system for further evaluation.

A website, such as the FOX RACING SHOX website, can be utilized as a place for riders to go to check out settings other riders are using and why, and to provide a way to spend time in a community, such as a FOX RACING SHOX community. In one embodiment, the controller 65 will log ridden hours and will prompt the user to perform certain maintenance operations, and when data is downloaded to the computer system, such as a desktop/laptop machine, a link to the service procedure for the particular recommended service will pop up. The link will be to a video guild on how to perform the service, tools needed etc., if a user is at the max of a particular adjustment feature on the closed or open side, the controller 65 will make a recommendation to have a service provider, such as FOX RACING SHOX, re-valve their system to get that particular adjustment feature into the middle of its' range again, and will make recommendations to a service technician, such as a FOX RACING SHOX service tech, on what direction to make the valving changes, etc. A more elaborate system 300 can incorporate accelerometers, pressure sensors, etc.

FIGS. 4 through 22 illustrate templates for a program 325 executed on device 50, according to one embodiment. Program 325 may be implemented to assist a user in performing an initial setup of the vehicle 100 suspension. Program 325 is configured to run on a smartphone, tablet, iPod®, or other Internet enabled mobile device. Portions of program 325 may be supported and enabled for devices that include an image sensor 380 or video camera. In some embodiments, program 325 may be configured to be executed on a laptop or desktop computer. Program 325 may be installed on device 50 from an online repository containing applications compatible with device 50. For example, device 50 may be a smart phone such as Apple® iPhone and program 325 may be an application downloadable from the iTunes® store. Program 325 may be updated periodically via the Internet, may transmit saved settings to remote storage, and may download current suspension product information and physical characteristics. Product information, which may be used automatically in some calculations performed by program 325, may be stored in a database on device 50 or stored remotely on a location accessible through the device's network connection (e.g., wireless connection to the Internet).

In one embodiment, program 325 is used to manually setup front fork 80 and shock absorber 25 of vehicle 100. In some embodiments, vehicle 100 does not include sensors (5, 5b, 5c, etc.) for measuring the position of the vehicle suspension components. The vehicle suspension components may not include actuators, such as valve assembly 511, configured to adjust the damping rate remotely. In such embodiments, program 325 assists the user in manually adjusting the pressure in the air spring and the damping rate of the damping components in the shock absorbers. Furthermore, device 50 may be "dumb" in that device 50 does not communicate with a controller 65 to receive information about the operational characteristics of the vehicle suspension components.

If acquiring the program 325 for the first time, the user may connect to the online repository (e.g., iTunes) for downloading like programs 325 and either download the program 325 directly to device 50 or download the program 325 to a computer that is then synched to device 50 to transfer the program 325 to the device 50. Once the program 325 is loaded onto the device 50, the user can open the program 325 to begin the setup routine. Once the program 325 is loaded, the program displays a set of templates that allow the user to read instructions on how to setup the various components of the vehicle suspension, prompt the user for input such as the component IDs of the various suspension components or the user's weight with full riding gear, and display pictures or videos that show the user how to properly setup the vehicle suspension. The various screen shots of one embodiment of program 325 are described in more detail below.

Figure 4:
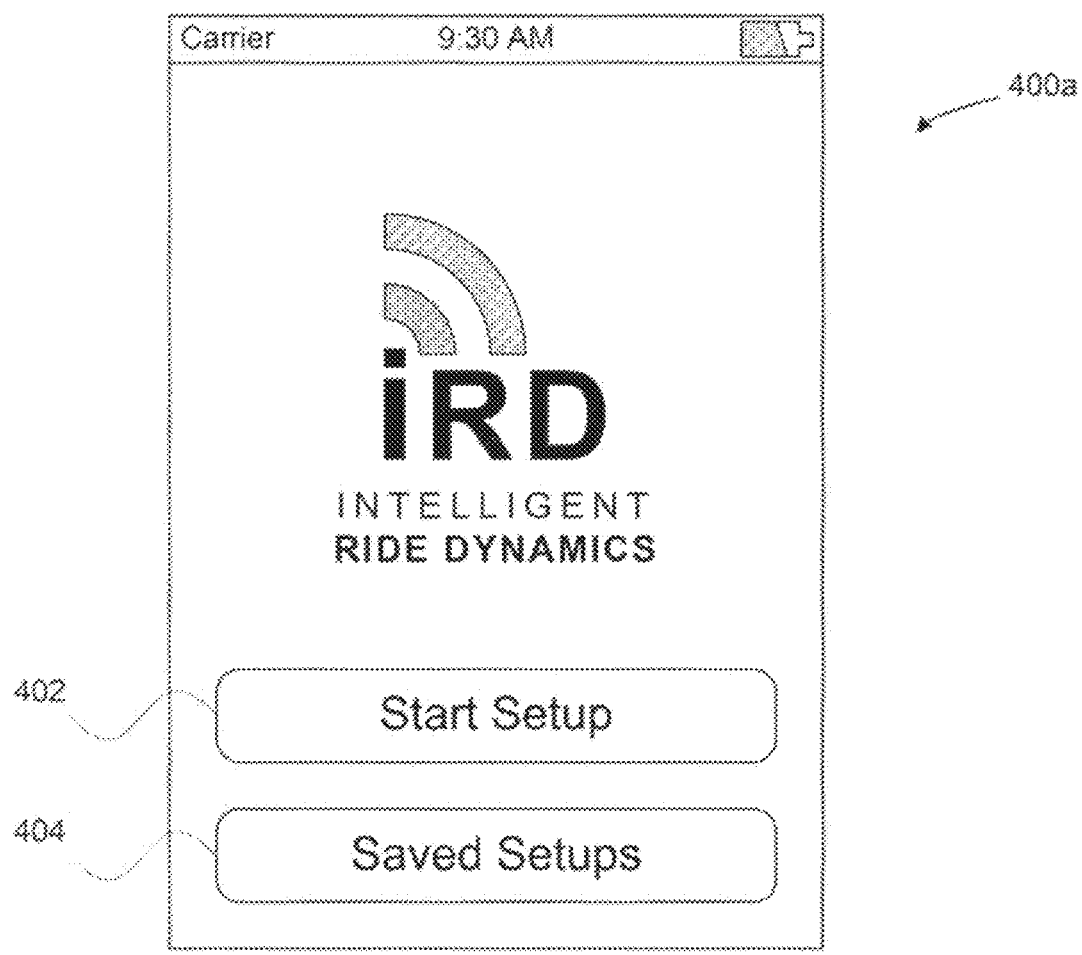
FIGS. 4-22 set forth a graphical user interface displayed by the suspension setup system, according to one example embodiment.

As shown in FIG. 4, program 325, when executed by processor 310, is configured to display a graphical user interface (GUI) 400 that includes a plurality of templates such as the first screen shot 400a. GUI 400 includes a status bar at the top of the display that includes information such as a time, cellular connectivity information, and battery status. It will be appreciated that other types of information may be included in the status bar. Furthermore, in some embodiments, the status bar may be controlled by an operating system executed by device 50 and not directly configured by program 325. The first screen shot 400a also displays a logo and description of the program 325. The first screen shot 400a includes user interface elements such as button 402 and button 404. As described above, display 350 may comprise a touch sensitive LCD panel that enables a user to touch the screen proximate to buttons 402 and 404 to provide input to program 325. As shown in FIG. 4, a user is given the option to create a new setup routine by selecting button 402 or to load a previously saved setup routine by selecting button 404.

Figure 5:
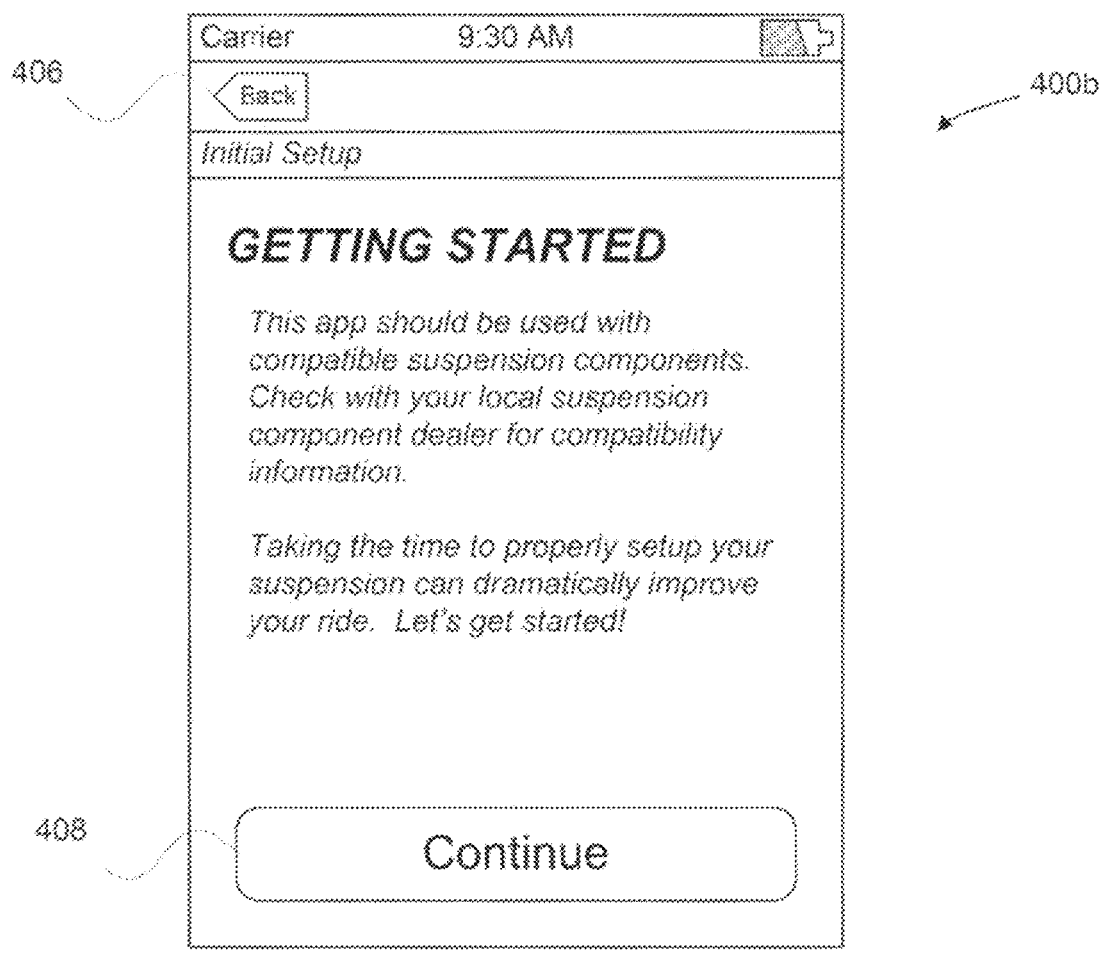

As shown in FIG. 5, when a user selects button 402 to create a new setup routine, program 325 displays a second screen shot 400b that includes a button 406 to go back to the first screen shot 400a. The second screen shot 400b includes information for a user that instructs the user that further information may be available from a source such as a vehicle suspension component supplier. The second screen shot 400b also includes a button 408 that, when selected, begins the setup routine.

Figure 6:

As shown in FIG. 6, a third screen shot 400c shows a user how to locate product identification information on vehicle forks 80 and shocks 25. As shown, product labels may include labels that provide a component ID (i.e., a unique code that specifies the particular suspension component installed on the vehicle 100). In one embodiment, the component ID comprises a 4-digit alpha-numeric code that uniquely identifies each suspension component type. The labels may include bar codes or QR codes that can be scanned using an image sensor 380 included in device 50. For example, a user may use an image sensor 380 to capture an image of the bar code on each of the fork 80 and shock absorber 25. Program 325 may then decipher the bar codes to automatically retrieve the component ID for the various vehicle suspension components. Again, the third screen shot 400c includes button 406 to go to the previous screen (e.g., 400b) and includes a button 410 to proceed to the next screen (e.g., 400d).

Figure 7:
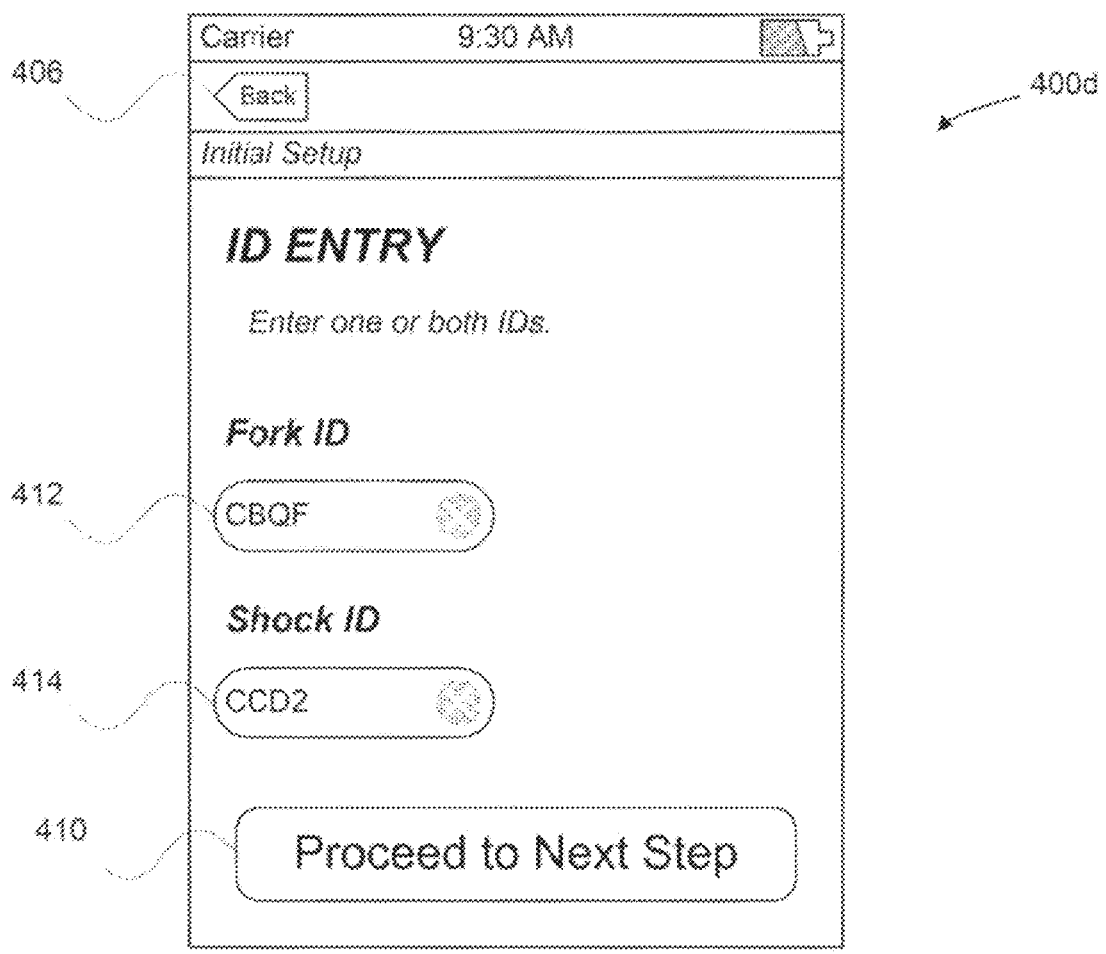

As shown in FIG. 7, a fourth screen shot 400d enables a user to manually input component IDs for both the fork 80 and the shock 25 for vehicle 100. Again, if the vehicle suspension component labels include a bar code or QR code, then the fourth screen shot 400d may include user interface elements that enable a user to automatically scan the labels to retrieve the component IDs. However, as shown in FIG. 7, the fourth screen shot 400d includes a first user interface element 412 and a second user interface element 414 that enable a user to manually enter component IDs for both the front fork 80 and the shock absorber 25, respectively. Touching either the first user interface element 412 or the second user interface element 414 may cause a keyboard to be displayed that lets a user type in the component IDs read from the labels. The fourth screen shot 400d also includes a button 406 to go to the previous screen (e.g., 400c) and a button 410 to proceed to the next screen (e.g., 400e).

User input entered in the fourth screen shot 400d may control the order that subsequent screen shots are displayed while performing the setup routine. For example, if a user only enters the component ID for the front fork 80, then only those screen shots associated with proper setup of the front fork 80 will be displayed. Similarly, if a user only enters the component ID for the shock absorber 25, then only those screen shots associated with proper setup of the shock absorber 25 will be displayed.

The component ID enables program 325 to query a database to retrieve product information related to the specific vehicle suspension component. The product information may include, but is not limited to, product name/model, the available external adjustments available for the component, the length of travel of the component, a preferred sag setting for the component, the range of adjustment for each of the external adjustors available for the component, and physical characteristics of the component such as air spring piston area, air volume compression ratio, composite spring curve shape, upper tube outside diameter for a fork, and shock body outside diameter for a shock. Once a user enters a component ID into user interface elements 412 or 414, program 325 may check the entered component ID against the product information in the database and indicate whether a match was found. For example, program 325 may display an error message when a match is not found for the entered component ID. Program 325 may display text or a graphic next to the user interface elements 412 and 414 when a match is found that indicates to a user that product information associated with the component ID was located. For example, a thumbnail image of the component may be displayed next to the user interface element 412 or 414.

Figure 8:
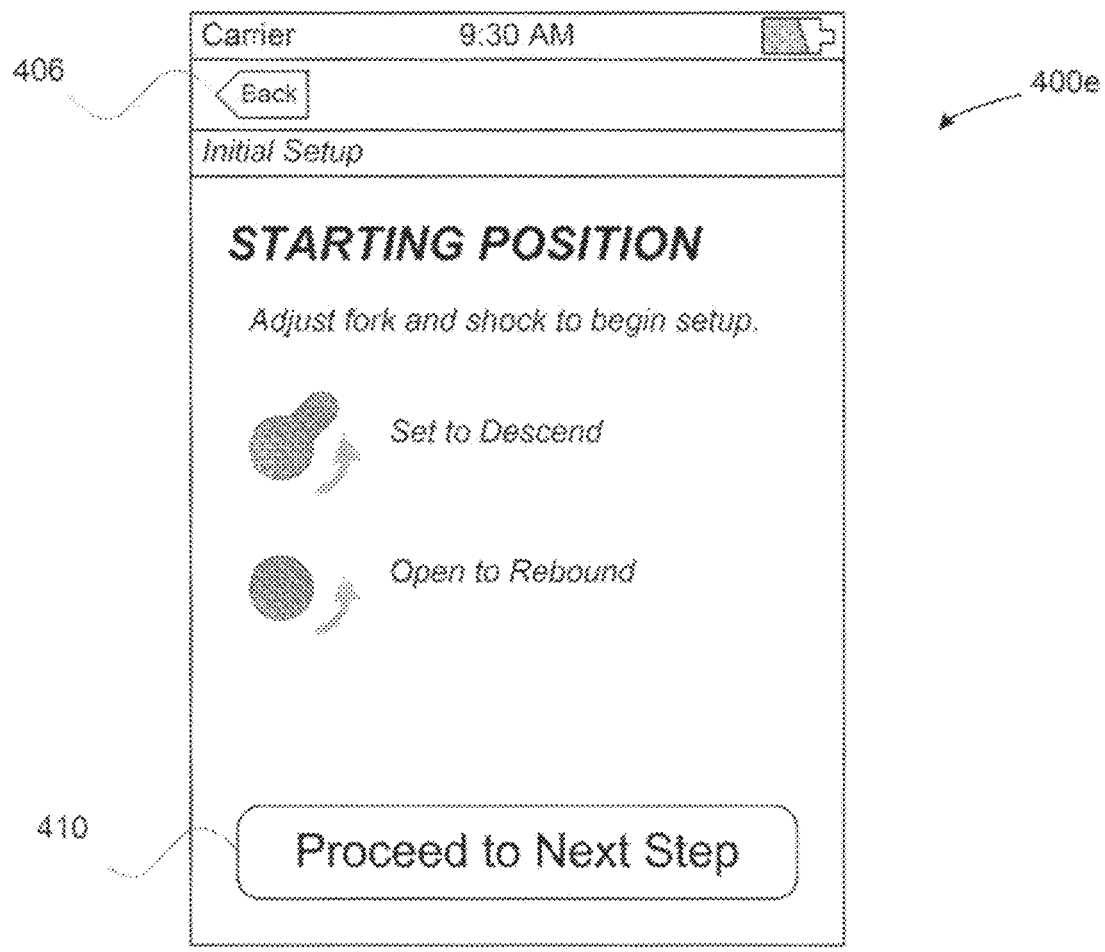

As shown in FIG. 8, a fifth screen shot 400e instructs a user to prepare the fork 80 and shock 25 for proper setup. The fifth screen shot 400e depicts how the fork compression damping adjusters and the fork rebound adjusters look on the product as well as how to set the adjusters at the beginning of the setup routine. The fifth screen shot 400e also includes a button 406 to go to the previous screen (e.g., 400d) and a button 410 to proceed to the next screen (e.g., 400f).

Figure 9:
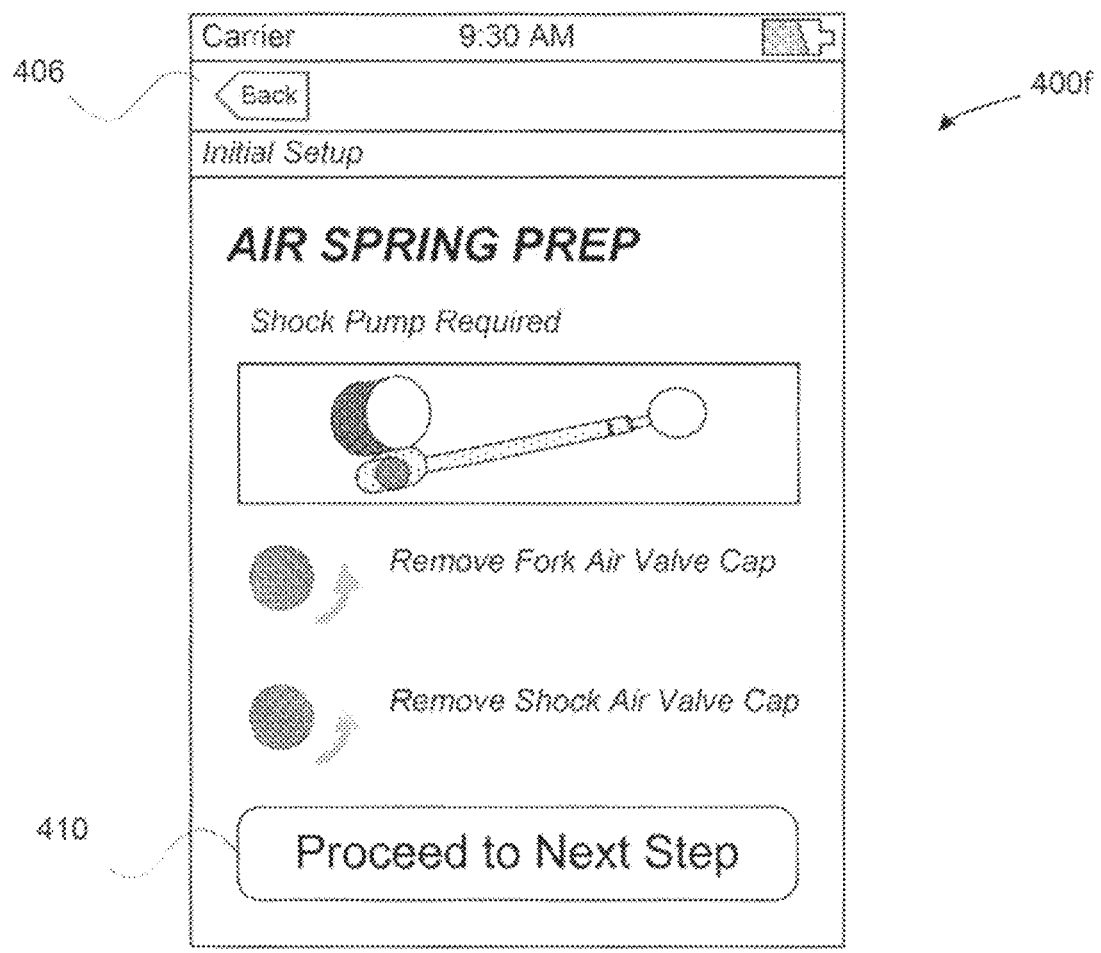

As shown in FIG. 9, a sixth screen shot 400f instructs a user to remove the air valve caps for the fork 80 and the shock absorber 25. In order to perform the setup routine, a user will need an air pump to properly set the air pressure in the fork 80 and shock absorber 25. The air pump may include an integrated air pressure gauge used to determine the current air pressure in the fork 80 or shock absorber 25. In some embodiments, the air pump may include an integrated pressure transducer that instructs the air pump how much pressure is in the fork 80 or the shock absorber 25. The user may set the air pump to pressurize the fork 80 or shock absorber 25 to a specific pressure and the air pump may automatically add air to the fork 80 or shock absorber 25 to the specific pressure. In some embodiments, the air pump may communicate directly with the device 50 such that the program 325 automatically configures the set points (i.e., suggested pressure) for pressurizing the fork 80 or shock absorber 25. The sixth screen shot 400f also includes a button 406 to go to the previous screen (e.g., 400e) and a button 410 to proceed to the next screen (e.g., 400g).

Figure 10:
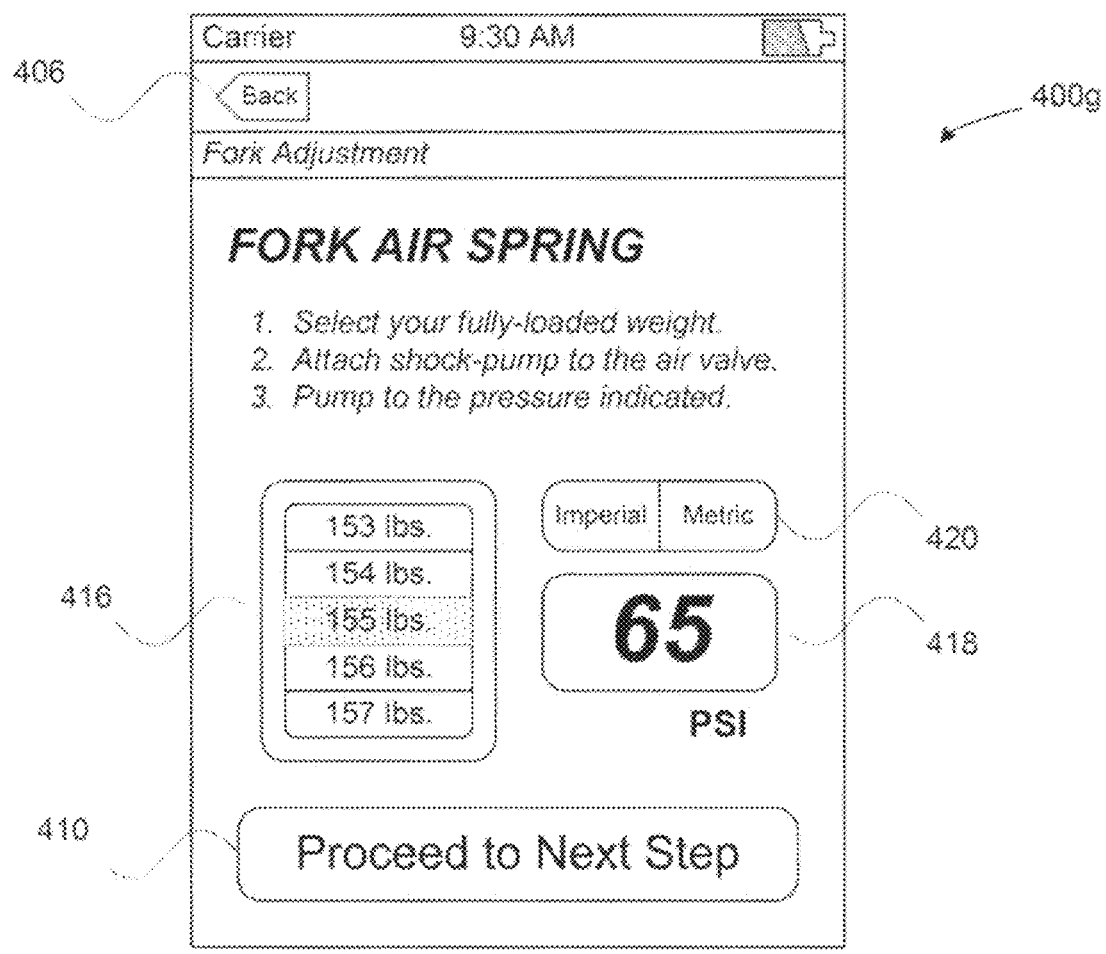
Figure 11A:
Figure 11B:
Figure 11C:
Figure 11D:
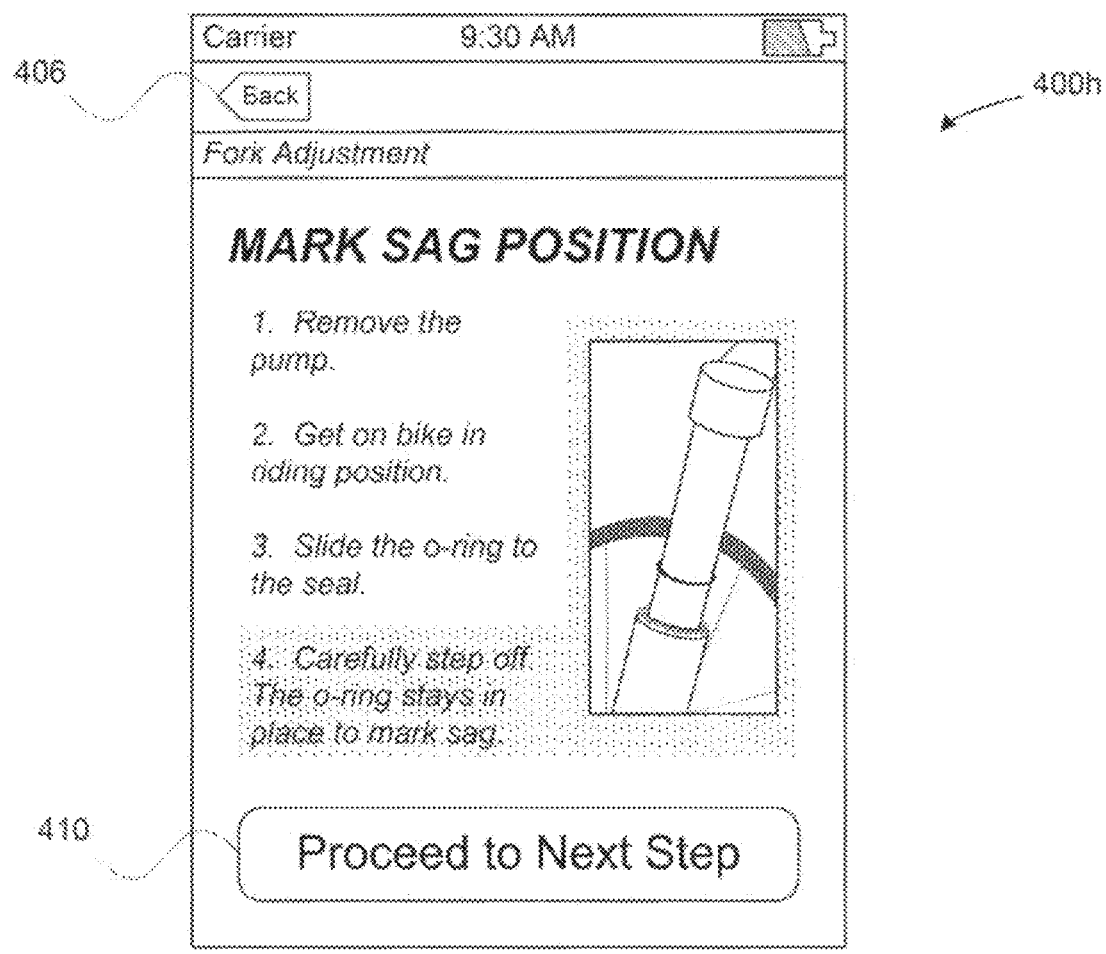

FIGS. 10 through 14 illustrate the fork adjustment specific screens displayed by program 325. As shown in FIG. 10, a seventh screen shot 400g enables a user to determine an initial pressure setting for the fork 80 depending on a fully-loaded weight of the user. The seventh screen shot 400g includes a first user interface element 416 that enables a user to enter the fully-loaded weight for the intended riding conditions. As shown, the first user interface element 416 may be a selector wheel that can be moved up or down to select the desired fully-loaded weight. In alternative embodiments, the first user interface element 416 may be similar to user interface elements 412 or 414 that enable a user to enter the weight using a keyboard. In yet other embodiments, device 50 may be in communication with a scale or other sensor that measures the fully-loaded weight of the user. For example, a user may be able to sit on a vehicle and a sensor, such as a strain gauge and wheatstone bridge, may be used to measure the fully-loaded weight of the user.

The seventh screen shot 400g includes a second interface element 418 that indicates a target pressure at which the air spring in the fork should be set and a third interface element 420 that lets a user toggle between imperial units and metric units. For example, as shown, imperial units (i.e., pounds and pounds per square inch) are displayed in user interface element 416 and 418. Although not shown, the user may be instructed in how to attach and use the shock pump with the fork 80 via a description or graphical or video depiction. The target pressure is derived via a calculation based on the fully-loaded weight of the rider and the physical parameters of the suspension component retrieved in the product information. For example, the air spring compression ratio, the air spring piston area, the negative spring length, the negative spring rate, and the top-out spring rate can be used to calculate a more exact starting pressure. For example, the program 325 may be configured to calculate a starting pressure corresponding to a particular sag setting (e.g., 25%). Given the retrieved product information, the program 325 can determine a starting pressure that would result in the shock absorber 25 being compressed to 25% under a load equal to the selected fully-loaded weight. In one embodiment, the target pressure is calculated dynamically based on the product information. In another embodiment, the target pressure is pre-calculated for each possible fully-loaded weight and stored in an array that may be accessed by program 325. The seventh screen shot 400*g* also includes a button 406 to go to the previous screen (e.g., 400*f*) and a button 410 to proceed to the next screen (e.g., 400*h*).

FIGS. 11A through 11D illustrate an eighth screen shot 400*h* that provides a graphical depiction of how to set an indicator member located on a tube of the fork 80 to indicate a position of the fork 80 when fully-loaded. In this embodiment, the indicator member comprises an o-ring, but it is intended that similar or equivalent functionality can be provided by other structures, as described herein. For example, other structures may include a plastic member that fits tightly over the shaft of the suspension component (i.e., fork 80 or shock absorber 25) and is movable relative thereto. In a first step, as graphically depicted in FIG. 11A, the user is instructed to remove the pump from the valve of the air spring of the fork 80. In a second step, as graphically depicted in FIG. 11B, the user is instructed to get on the vehicle in a riding position. The user should be equipped with the proper riding gear to approximately match the fully-loaded weight entered by the user in the seventh screen shot 400*g*. In a third step, as graphically depicted in FIG. 11C, the user is instructed to slide the o-ring to the seal on the top of the lower tube on the fork 80. In a fourth step, as graphically depicted in FIG. 11D, the user is instructed to dismount the vehicle 100. As the fork 80 expands, the o-ring remains in position on the upper tube indicating an amount of travel between the fork 80 as compressed by the fully-loaded weight and the fork 80 as compressed only by the weight of the vehicle 100. It will be appreciated that the user should take care when dismounting the vehicle 100 to avoid further compressing the fork 80 past the steady state position based on the fully-loaded weight of the rider and intended riding gear. The eighth screen shot 400*h* also includes a button 406 to go to the previous screen (e.g., 400*g*) and a button 410 to proceed to the next screen (e.g., 400*i*).

It is to be noted however, that the invention is not limited to the use of an o-ring as the indicator member. In other embodiments, the indicator member can be any suitable e.g. a full or part ring of plastics material. When in the form of a part-ring, the user could clip the indicator member to the shaft for the purposes of sag adjustment and then remove the part-ring when finished. In other embodiments, a full or part-ring is fitted to the suspension component at point of manufacture. The indicator member can be any colour or combination of colours that enables it to be identified by an object recognition algorithm when mounted on the suspension component.

Figure 12A:
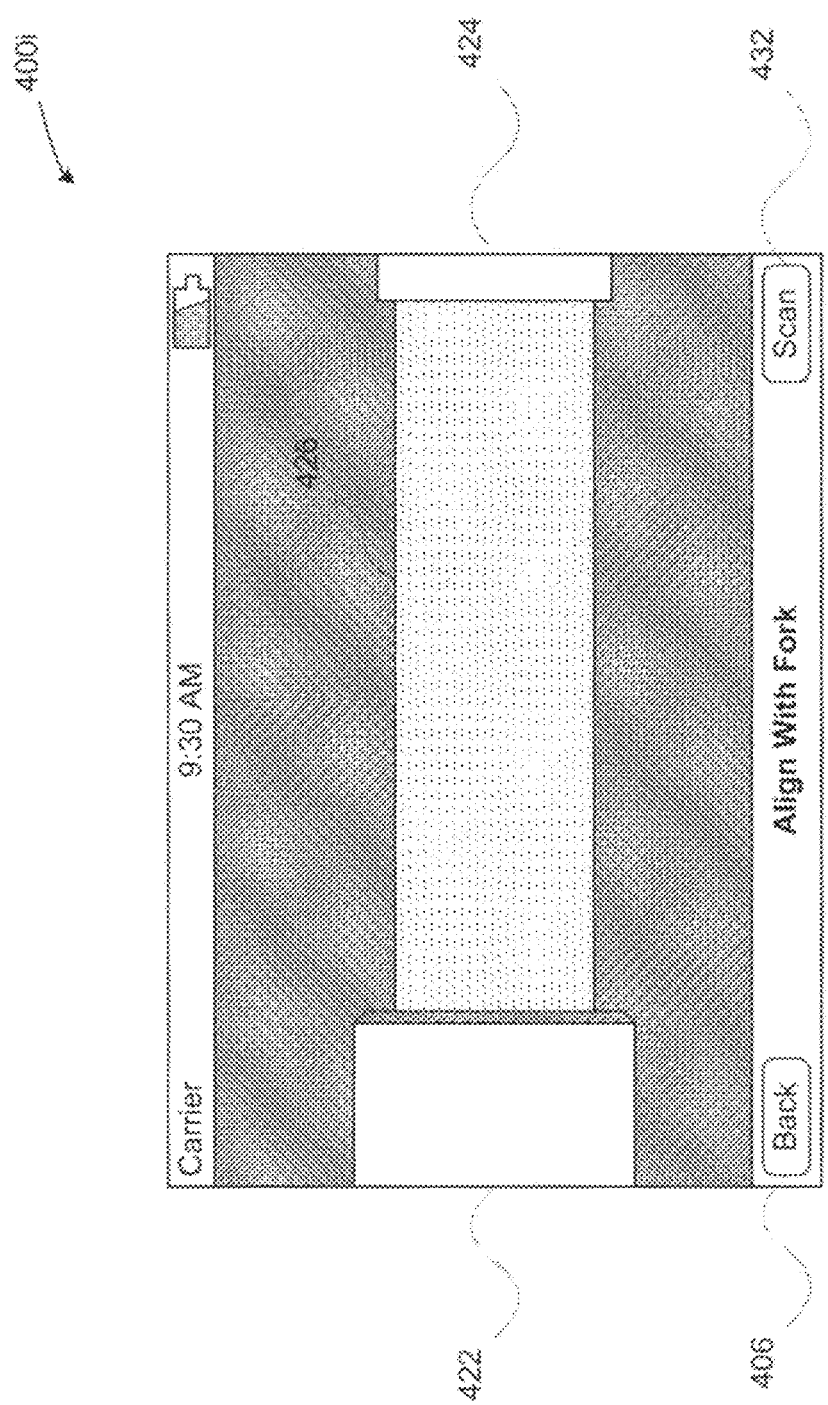

As shown in FIG. 12A, a ninth screen shot 400*i* shows a graphical overlay to be used in conjunction with a camera mode of the device 50. The graphical overlay is a depiction of the air spring leg of the front fork 80 and is selected from one or more graphical overlays corresponding to the various vehicle suspension components. The particular graphical overlay displayed in the ninth screen shot 400*i* is selected based on the front fork component ID entered on the fourth screen shot 400*d*. The graphical overlay includes portions 422 and 424 that correspond to the approximate shape of the upper portion of the lower tube and the cap for the upper tube, respectively. The graphical overlay also includes a partially transparent portion 426 that corresponds to the shaft for the upper tube of the air spring leg of the fork 80.

Figure 12B:
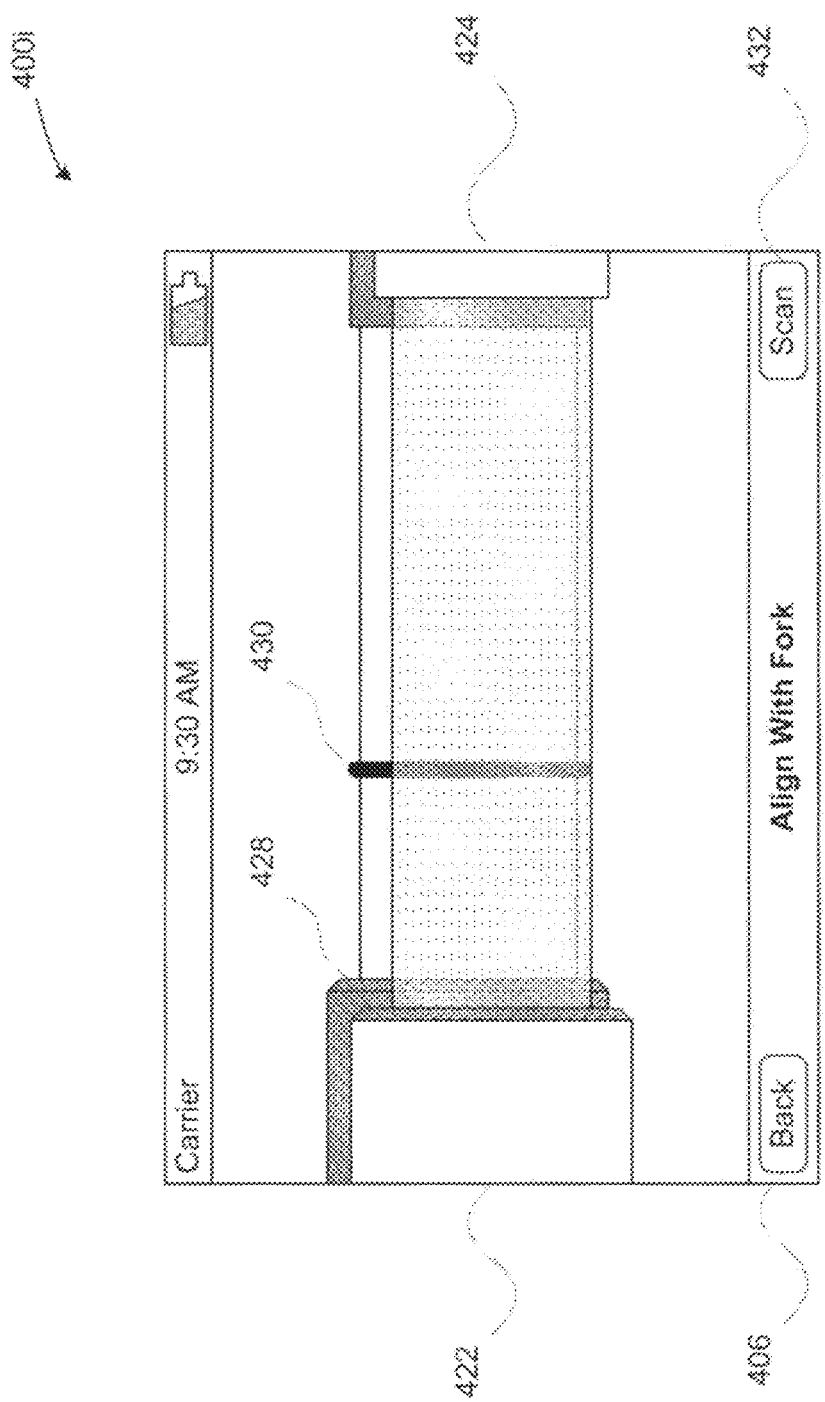

As shown in FIG. 12B, when program 325 displays the ninth screen shot 400*i*, program 325 may activate a camera mode of device 50. In the camera mode, program 325 may display an image captured using an image sensor 380 under the graphical overlay of the front fork. The image may be updated periodically such as in a video mode where a new image is captured every 33 ms (i.e., 30 frames per second). Periodically updating the image in a video mode enables the user to align the scene with the fork 80 with the graphical overlay portions 422, 424. The user moves the device 50 such that the seal 428 on the top edge of the lower tube of the fork 80 is approximately aligned with the portion 422 of the graphical overlay corresponding to the upper portion of the lower tube. The user also moves the device 50 such that the scale of the lower tube is approximately equal to a scale of the graphical overlay such as by matching the captured diameter of the lower tube of the fork to the width of the portion 422 of the graphical overlay. When the device 50 is in the correct relative position to capture an image of the fork 80 at the correct scale and orientation, the user may select the scan user interface element 432 to capture an image of the fork 80. In one embodiment, because the diameter of the lower tube is known from the product information specified by the component ID, the program 325 can measure the width of the lower tube, in pixels, of the fork captured by the image sensor 380 and compare that to the distance, in pixels, between the seal 428 of the lower tube and the position of the o-ring 430. The ratio of the distance to width, in pixels, may be multiplied by the known diameter of the lower tube to determine an amount of compression of the fork 80 based on the fully-loaded weight of the rider (i.e., amount of sag). In some embodiments, the fork 80 or shock 25 may include markings, such as index marks or dots, on the component that enable program 325 to register a scale of the component. For example, the markings may be of high contrast with the surface of the shock component and equally spaced such that object recognition is easily performed. In another embodiment, the program 325 may assume that the user has captured the image of the fork 80 at the same scale as the graphical overlay. Therefore, program 325 may only measure the position of the o-ring 430 in the image relative to pixels corresponding to the edge of the portion 422 of the graphical overlay. The program 325 may implement an image processing algorithm, described more fully below in connection with FIGS. 24A-26B, to determine the location of the o-ring 430 in relation to the graphical overlay.

In alternative embodiments, the graphical overlay may include indicators that provide the user with feedback as to whether the proper sag setting has been achieved. For example, the graphical overlay may include a line or other indicator that indicates the approximate location of the o-ring corresponding to a preferred sag setting (e.g., 1.5 inches of travel for a fork with 6 inches of total travel corresponding to 25% sag). In some embodiments, the graphical overlay may also include gradient indicators in combination with pressure delta recommendations indicating whether the user should refine the pressure in the air spring. For example, if the sag setting is off by more than 5%, the color gradient may change from green to yellow indicating that further adjustment of the pressure in the air spring is appropriate. If the sag setting is off by 20%, then the color gradient may change from yellow to red indicating that further adjustment of the pressure in the air spring is necessary. The ninth screen shot 400*i* also includes a button 406 to go to the previous screen (e.g., 400*h*) and, although not shown explicitly, a button 410 to proceed to the next screen (e.g., 400*j*). The scan user interface button 432, once pressed, may be replaced with button 410. In other embodiments, the scan user interface button 432 as well as buttons 406 and 410 may be displayed simultaneously.

Figure 13:

As shown in FIG. 13, a tenth screen shot 400*j* instructs a user to make an adjustment to the air pressure in the air spring of the fork 80. The tenth screen shot 400*j* includes a user interface element 434 that specifies the new adjusted pressure for the air spring based on the measured o-ring 430 position. The tenth screen shot 400*j* also includes a button 406 to go to the previous screen (e.g., 400*i*) and a button 410 to proceed to the next screen (e.g., 400*k*).

Figure 14:
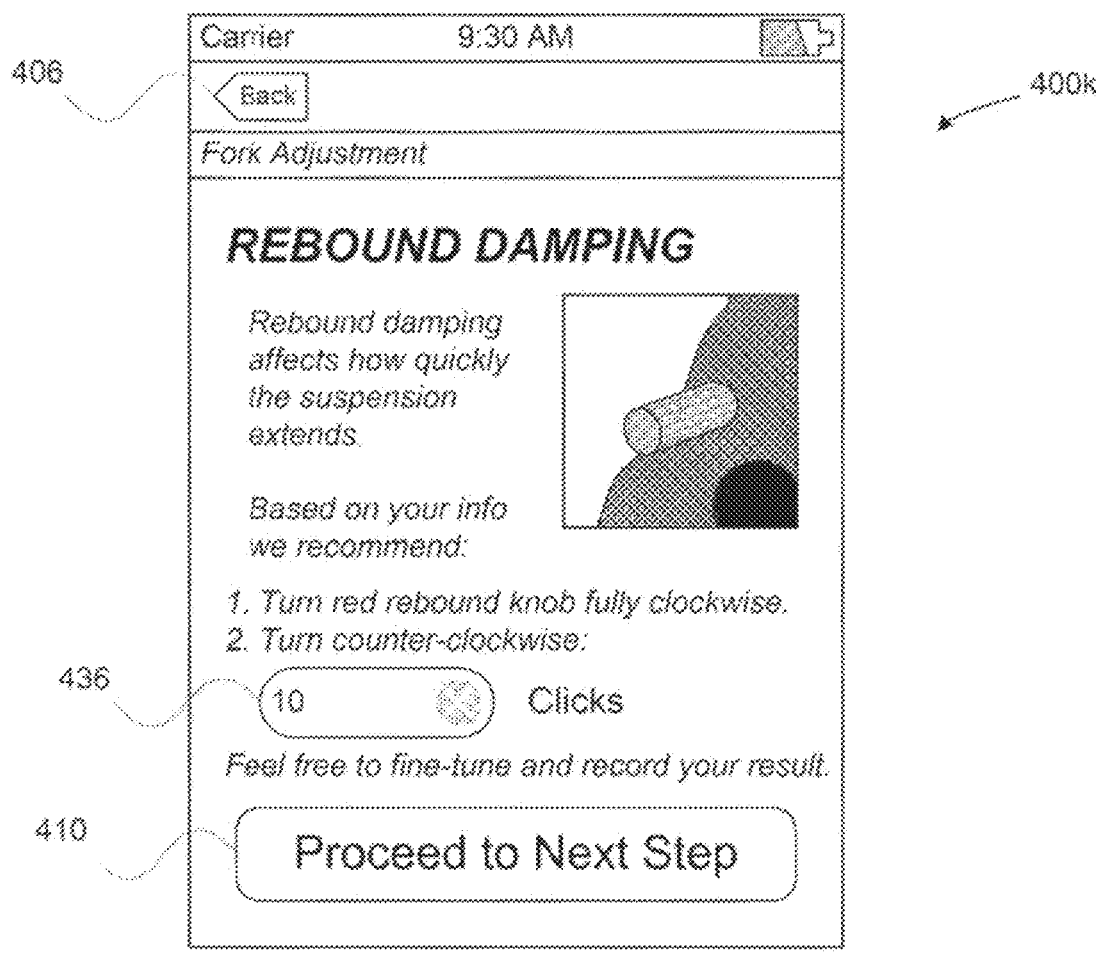
Figure 15:
Figure 16A:
Figure 16B:
Figure 16C:
Figure 16D:

As shown in FIG. 14, an eleventh screen shot 400*k* instructs a user to make an adjustment to the rebound damping setting for the fork 80. In one embodiment, the rebound damping setting is calculated based on the adjusted air pressure setting of the air spring of the fork 80. In one embodiment, the fork 80 includes an external adjuster for adjusting the amount of rebound damping in the damping leg of the fork 80. The rebound damping is adjusted by turning the knob counter-clockwise to increase the damping, thereby slowing how quickly the fork 80 extends after being compressed by terrain. The eleventh screen shot 400*k* includes a user interface element 436 that specifies the setting for the external rebound adjuster. For example, as shown, a user may turn the external rebound adjuster fully clockwise, corresponding to the minimum amount of rebound damping. Then, the user turns the external rebound adjuster clockwise by the specified number of clicks, each click corresponding to a discrete adjustment point. In alternative embodiments, fork 80 may include other means for adjusting the amount of damping implemented in the damping leg of the fork 80. For example, the rebound damping may be adjusted by a level, a dial, a cam, an electrically or pneumatically controlled actuator, or any other technically feasible mechanism for adjusting the rebound damping. In the alternative embodiments, the instructions and user interface element 436 may reflect instructions and settings for these alternative mechanisms. In some embodiments, the eleventh screen shot 400*k* instructs a user to make an adjustment to the compression damping setting for the fork 80. The compression damping setting may also be calculated based on the adjusted air pressure setting of the air spring of the fork 80.

Once the user has adjusted the rebound damping to the correct setting, the fork 80 is properly setup. As long as the user has entered a valid component ID for a shock absorber 25 into user interface element 414 of FIG. 7, the setup routine continues by displaying the set of templates associated with the setup of a shock absorber 25. The eleventh screen shot 400*k* includes a button 406 to go to the previous screen (e.g., 400*j*) and a button 410 to proceed to the next screen (e.g., 400*l*).

FIGS. 15 through 19 illustrate screen shots 400*l* through 400*p* displayed to assist the user in performing proper setup of a shock absorber 25. Screen shots 400*l* through 400*p* are similar to screen shots 400*g* through 400*k* of FIGS. 10 through 14, except displaying information and graphical overlays related to the shock absorber 25 identified by the component ID entered into user interface element 414 rather than the fork 80 identified by the component ID entered into user interface element 412. As shown, each screen shot 400*l* through 400*p* includes a button 406 to go to the previous screen and a button 410 to proceed to the next screen. Some of the graphical depictions may be changed to show the location of controls or adjusters associated with shock absorber 25 instead of fork 80. Once setup of shock absorber 25 is complete, a user may select button 410 of sixteenth screen shot 400*p* to proceed to the next screen (e.g., 400*q*).

Figure 20:
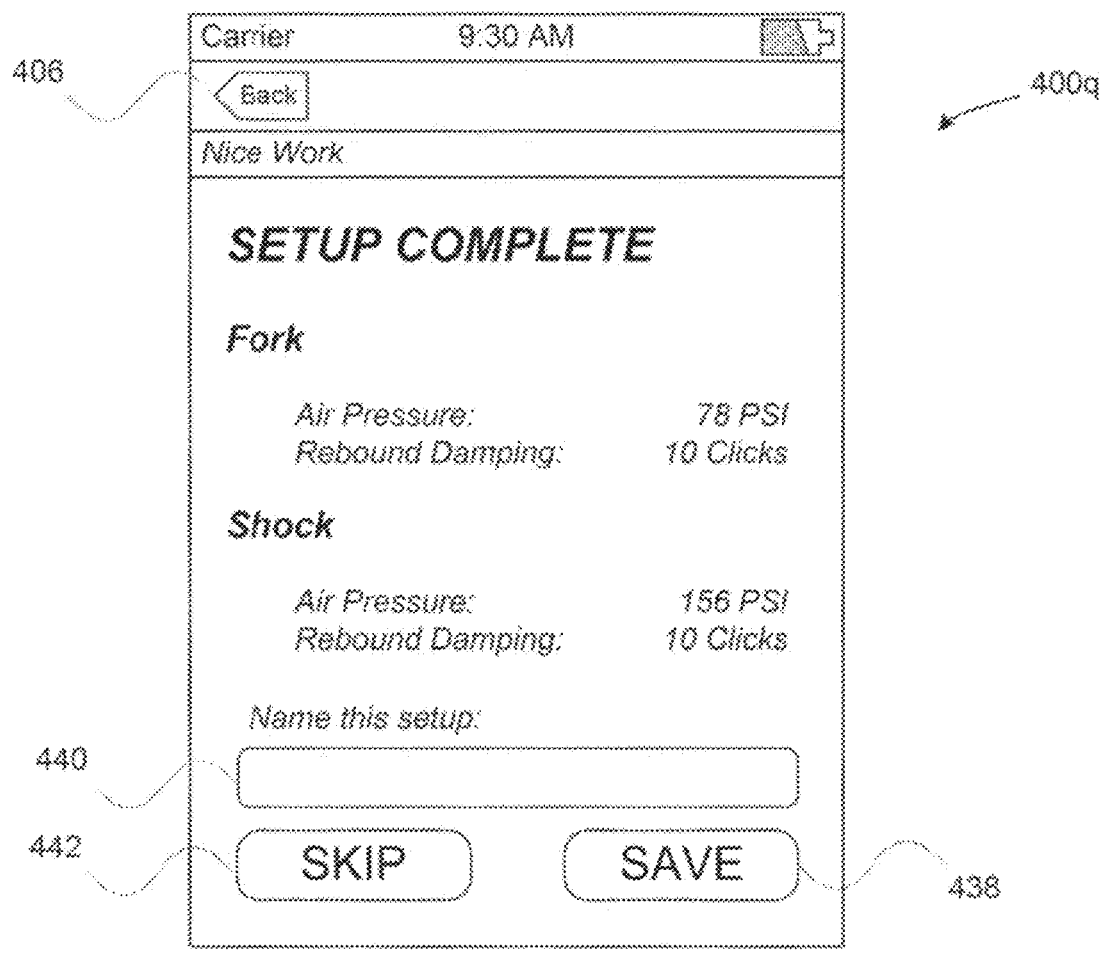

As shown in FIG. 20, a seventeenth screen shot 400*q* displays a summary of the setup parameters to the user. Setup parameters for the fork 80 include a target air pressure for the air spring of the fork 80 and a rebound damping setting for the damper of the fork 80. Setup parameters for the shock absorber 25 include a target air pressure for the air spring of the shock absorber 25 and a rebound damping setting for the damper of the shock absorber 25. The seventeenth screen shot 400*q* includes a first button 438 that enables a user to save the setup parameters associated with the just completed setup routine. An user interface element 440 enables a user to type a name for the saved setup routine. If the user so chooses, a button 442 enables the user to discard the setup parameters and return to the home screen 400*a*. The seventeenth screen shot 400*q* also includes button 406 to go back to the previous screen (e.g., 400*p*).

Figure 21:
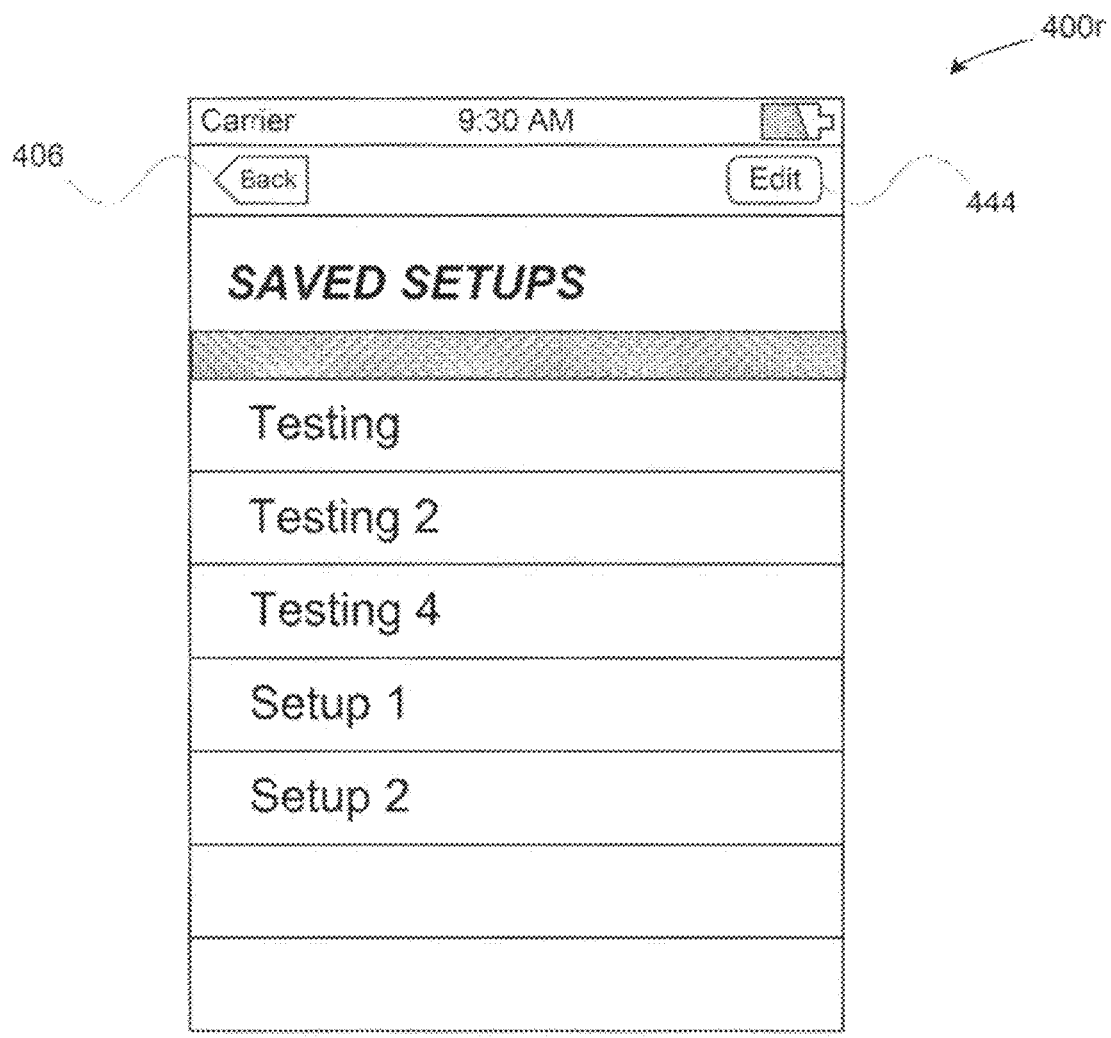

Returning to the first screen shot 400*a* of FIG. 4, instead of performing a new setup routine by selecting button 402, a user may simply refer to setup parameters stored in saved setup routines by selecting button 404 and proceeding to an eighteenth screen shot 400*r*. As shown in FIG. 21, an eighteenth screen shot 400*r* displays a list of saved setup routines. The eighteenth screen shot 400*r* includes a button 444 that enables a user to edit each of the saved setup routines. In one embodiment, selecting the button 444 lets a user delete any of the saved setup routines. In another embodiment, selecting the button 44 lets a user change any of the saved parameters in the setup routine. For example, after performing a setup routine and riding the vehicle for a period of time, a user may determine that they prefer a stiffer suspension and, therefore, may edit the parameters in the setup routine to indicate higher air pressures for the air spring of the fork 80 or the air spring of the shock absorber 25, or both. The eighteenth screen shot 400*r* also includes a button 406 to go back to the previous screen (e.g., 400*a*).

Figure 22:
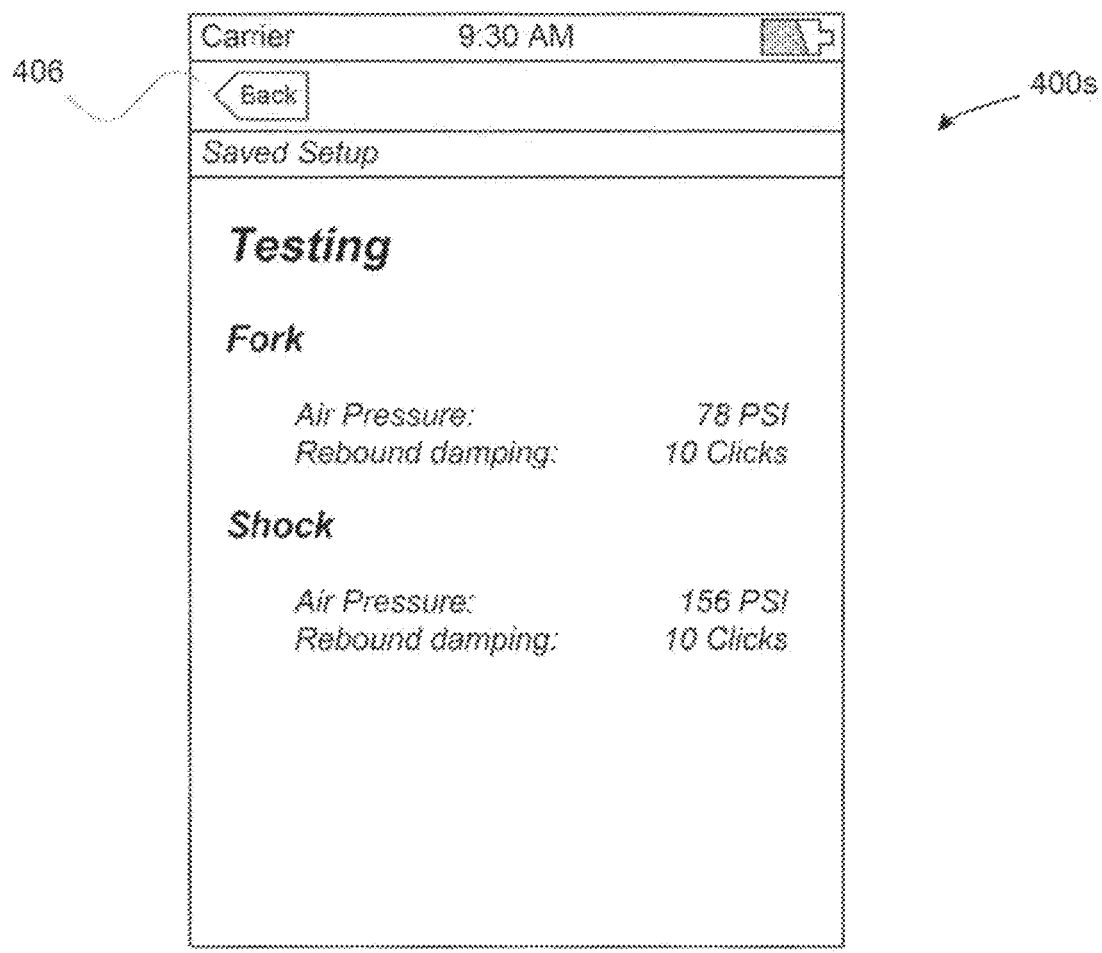

Selecting any of the saved setup routines listed in the eighteenth screen shot 400*r* causes program 325 to display the nineteenth screen shot 400*s*, as shown in FIG. 22. The nineteenth screen shot 400*s* displays the setup parameters for the selected setup routine. The nineteenth screen shot 400*s* also includes a button 406 to go back to the previous screen (e.g., 400*r*).

The image overlay view of the ninth screen shot 400*i* or the fourteenth screen shot 400*n* helps the user measure and properly set a vehicle suspensions sag. The view comprises a graphical overlay on top of a live view as seen from an image sensor 380. This technique for viewing a live image with a graphical overlay may sometimes be referred to as a heads-up display or HUD. The user may move and orient the device 50 via 6 degrees of freedom (i.e., translation in x, y, and z coordinates as well as rotation around each of the three axes). Thus, the user can line up the live view of the suspension component with the static overlay of the graphical representation of the component.

Various methods exist to align and orient the live view with the graphical overlay. In one embodiment, the user may align two or more indicators in the graphical overlay with corresponding points on the suspension component. For example, the user may align one indicator with a left edge of the lower tube of the fork 80 in the view and a second indicator with a right edge of the lower tube of the fork 80 in the view. Aligning these two indicators with the corresponding opposite edges of the lower tube will ensure that the live view is correctly scaled to the graphical overlay. Aligning the top edge of the lower tube (i.e., a seal) with a third indicator will then ensure that the graphical overlay is correctly positioned. The size and scale of the graphical overlay corresponds to the physical dimensions of the suspension component.

Figure 23A:
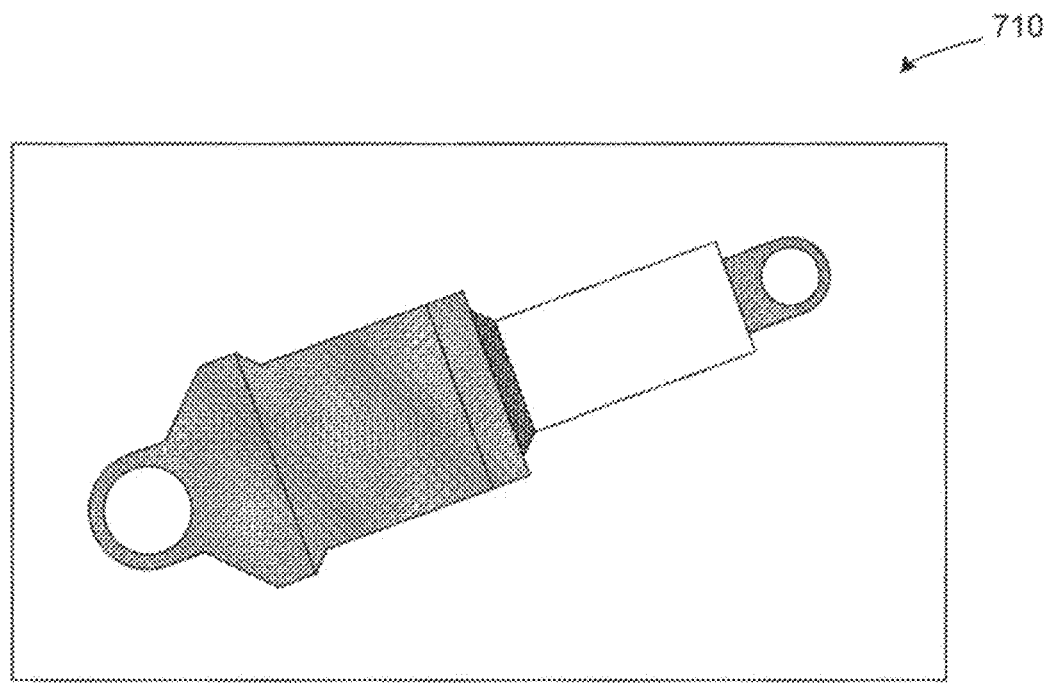
FIGS. 23A-23F illustrate a technique for aligning a device with a suspension component, according to one example embodiment.
Figure 23B:
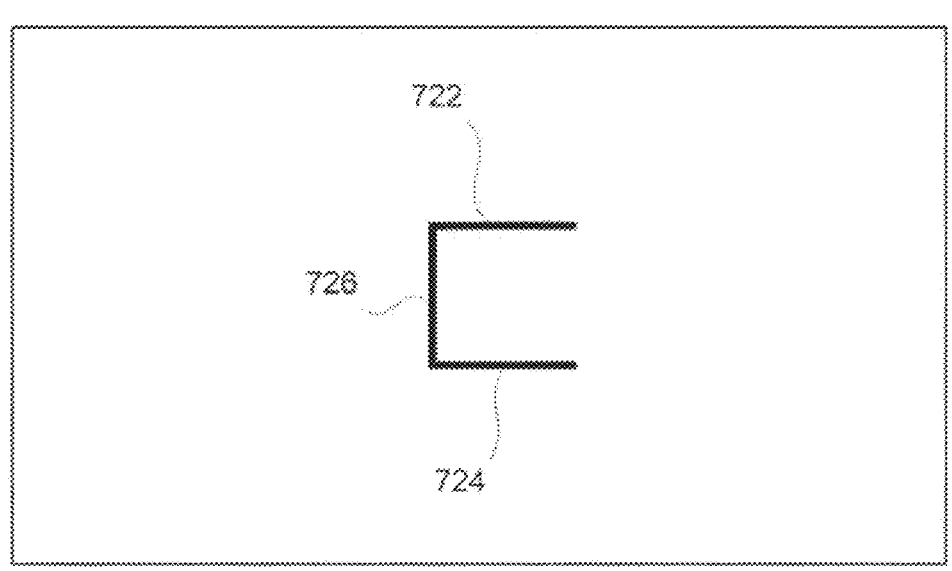
Figure 23C:
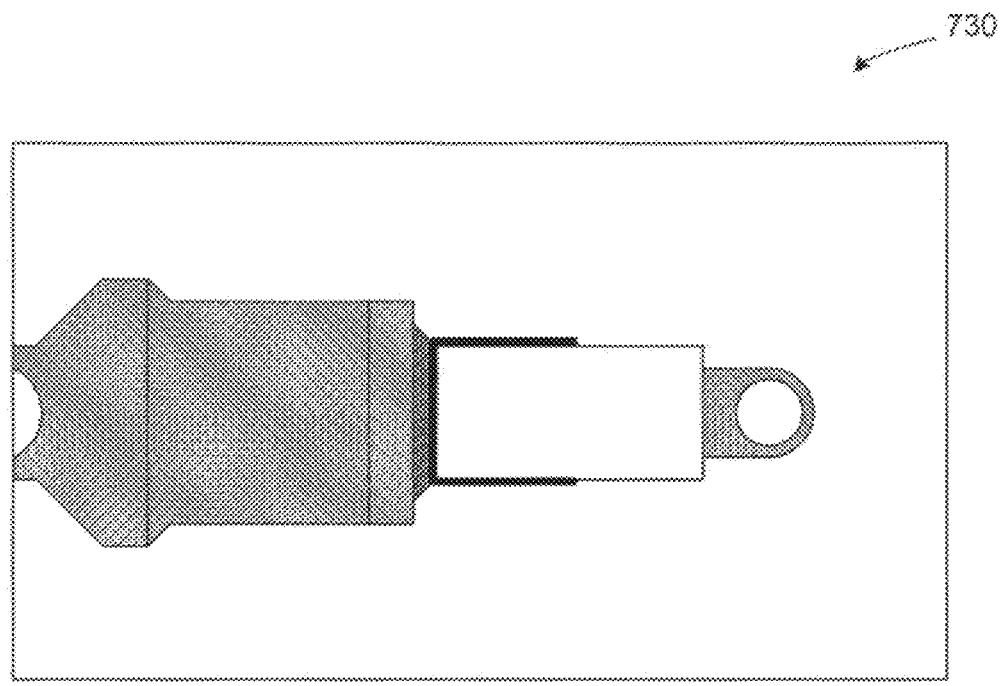
Figure 23D:
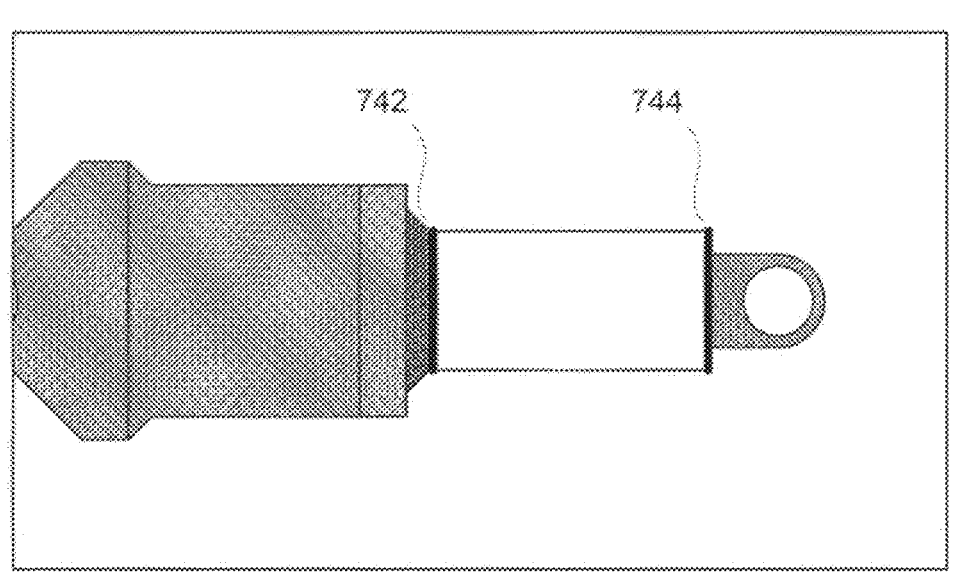
Figure 23E:
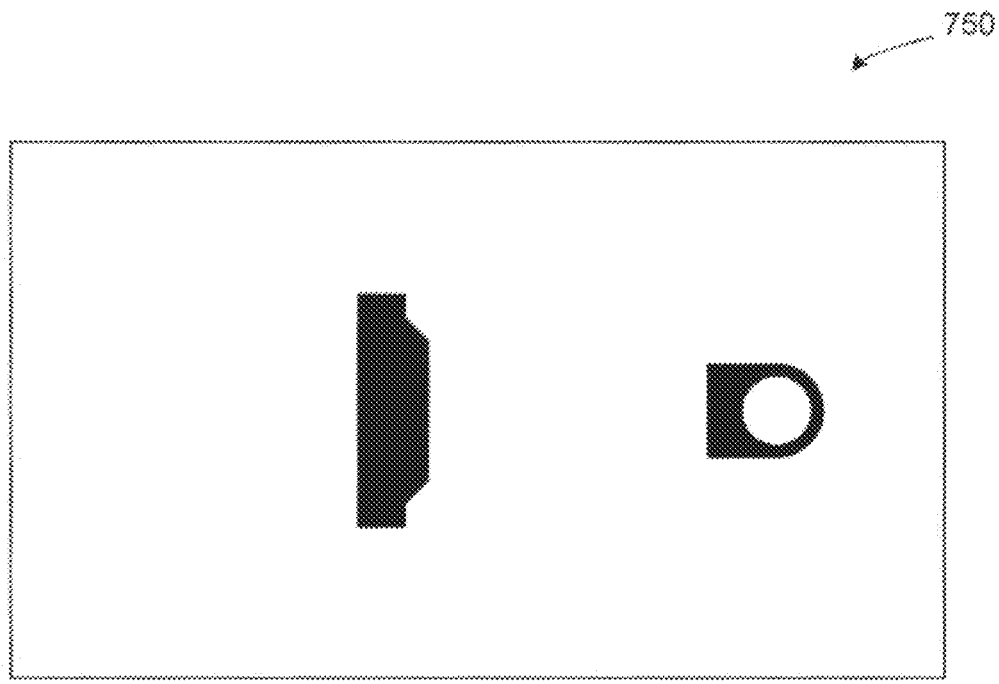
Figure 23F:
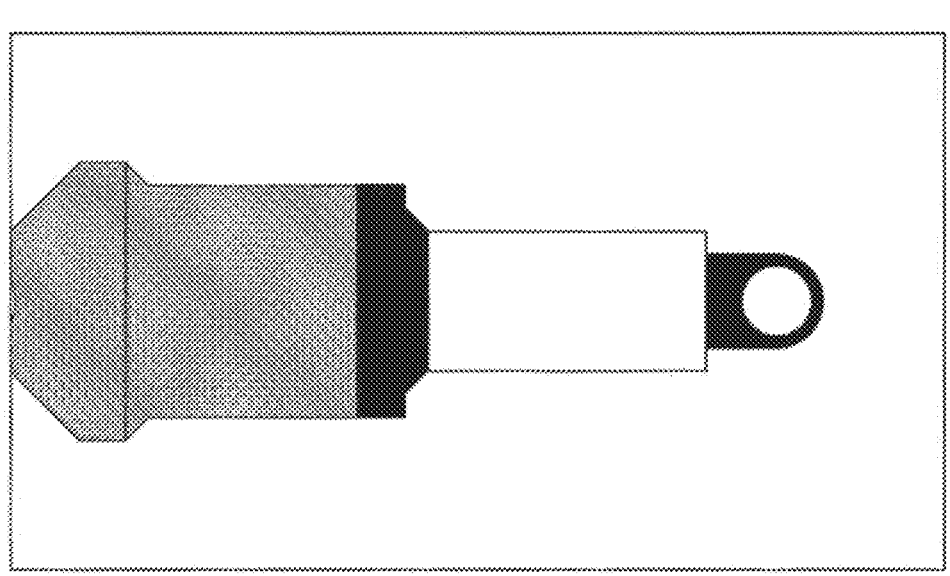

FIGS. 23A-F illustrate one technique for aligning a live view 710 captured by an image sensor 380 with a graphical overlay 720 shown on the display 350 of the device 50, according to one embodiment. A live view 710 captured from the image sensor 380 is shown in FIG. 23A. The live view 710 includes an image of a shock absorber captured by the image sensor 380. FIG. 23B shows a graphical overlay 720 displayed on the display 350 and superimposed on top of the live view 710 captured by the image sensor 380. The graphical overlay 720 includes three indicators 722, 724, and 726 (e.g., lines) used to align and orient the live view 710 of the shock absorber with the device 50. FIG. 23C shows a composite image 730 of the live view 710 aligned with the graphical overlay 720. FIG. 23D shows another composite image 740 of the live view 710 aligned with a second graphical overlay having two indicators; a first indicator 742 aligned with the sealed end of the shaft of the shock absorber and a second indicator 744 aligned with a bushing end of the shaft of the shock absorber. FIG. 23E shows a third graphical overlay 750 that includes graphical representations for one or more portions of the shock absorber. In the example shown in FIG. 23E, a portion of the sealed end of the main cylinder body of the shock absorber is shown along with a bushing at the other end of the shaft. FIG. 23F shows yet another composite image 760 of the live view 710 aligned with a third graphical overlay 750.

Figure 24A:
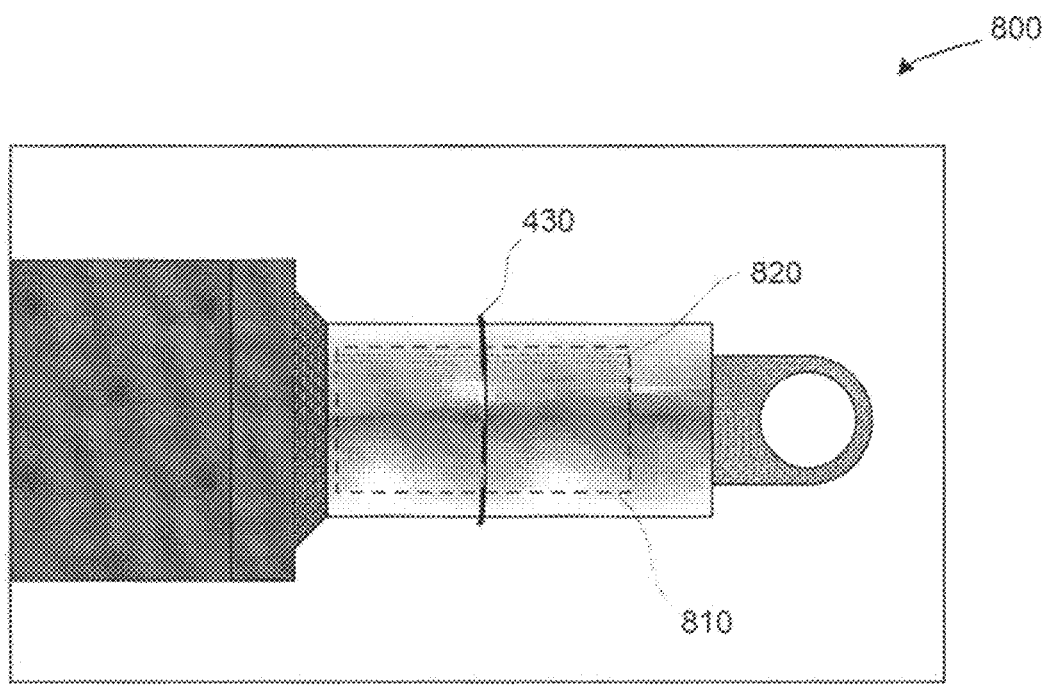
FIGS. 24A and 24B illustrate an object detection algorithm for determining the location of o-ring relative to the suspension component, according to one embodiment.
Figure 24B:
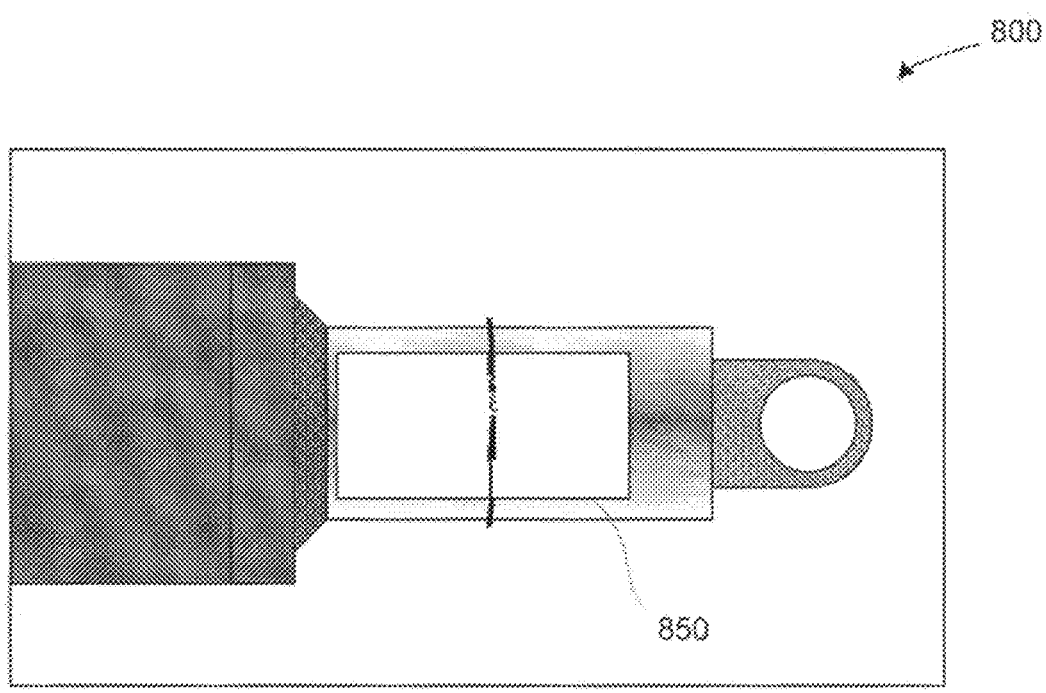

Once the live image 710 has been correctly aligned with the graphical overlay 720, the program 325 analyzes one or more frames 800 captured from the image sensor 380 to recognize and determine an o-ring 430 position on the shaft of the suspension component. FIGS. 24A and 24B illustrate an object detection algorithm for determining the location of o-ring 430 relative to the suspension component, according to one embodiment. As shown in FIG. 24A, frame 800 comprises a digital image of the suspension component captured by the image sensor 380. The format of frame 800 may be in any technically feasible digital image format (e.g., a bitmap or JPEG (Joint Pictures Expert Group)), that stores digital image data for a plurality of pixels. For example, for bitmaps at 24 bpp (bits per pixel) in an RGBA format, each pixel is associated with 4 channels of color data (i.e., red, green, blue, and alpha) at 8 bits per channel (i.e., each color is stored as an intensity value that ranges between 0-255). Program 325 analyzes each of the one or more frames 800 to determine a location of the o-ring 430 on the shaft.

In one embodiment, for each frame 800, program 325 analyzes a portion 810 of the frame 800 that, if the live image 510 was properly aligned with device 50, corresponds to the shaft of the suspension component. Program 325 crops the frame 800 so that the analysis is only performed on the smaller portion 810 comprising a subset of pixels of frame 800, which should correspond to pixels associated with the surface of the shaft and a portion of the o-ring 430. Program 325 also converts the portion 810 from a color format to a grayscale format (i.e., 8 bits per pixel that represents an intensity level between white (255) and black (0)). Typically, most devices with integrated image sensors include a CMOS sensor or CCD sensor with an integrated color filter array that captures color images. However, the object detection algorithm implemented by the program 325 does not detect objects, or edges of objects, based on color. Therefore, converting the image data to grayscale may reduce the complexity of calculations during image processing.

It will be appreciated that the shaft of the suspension components is typically a tube of machined aluminum or some other type of curved surface of various metallic materials. The curved surface of the shaft results in specular highlights reflected off the surface such that the intensity values associated with the surface of the shaft as captured by the image sensor 380 have a wide range in values. However, specular reflection depends largely on the orientation of the surface from the light source. In other words, across the width of the shaft, the intensity of the pixel may vary wildly across the shaft, but along the length of the shaft (i.e., parallel to the longitudinal axis), the intensity of the pixels should be relatively similar except at discontinuities in the surface such as located at the edges of the o-ring 430. Thus, in one embodiment, program 325 creates slices 820 of the portion 810 of the frame 800 and analyzes each slice 820 independently, as described below. In one embodiment, each slice 820 is equivalent to one row of pixels from the portion 810 of the frame 800.

In one embodiment, for each slice 820, program 325 normalizes the intensity levels for each of the pixels included in the slice 820. Again, for each pixel represented as a grayscale 8-bit intensity value, 0 represents black and 255 represents white with shades of gray represented between 0 and 255. Normalizing the intensity value for the pixels increases the contrast of that particular slice 820. For example, if the range of intensity values for all pixels in the slice 820 is between 53 and 112, normalizing the intensity values of the pixels comprises setting each pixel's intensity value to between 0 and 255 based on the relative position of the old intensity value to the range between 53 and 112. After the first normalizing step is complete, program 325 clips the intensity values for all pixels in the normalized slice 820 above a threshold intensity level to be equal to the threshold intensity level. For example, any pixels having an intensity value above 50 are clipped such that all pixels have a maximum intensity value of 50. The resulting clipped slice 820 includes black pixels and pixels at various dark shades of grey. Program 325 then normalizes the intensity levels again, setting all pixels having an intensity value of 50 to equal 255 and the intensity levels for all other pixels between 0 and 254, where at least one pixel (i.e., the pixels in the original, unprocessed slice 820 with the lowest intensity value) has an intensity level of 0 (i.e., fully black).

Program 325 then combines the normalized slices 820 to form a high contrast image that is then filtered to generate a filtered image 850, as shown in FIG. 24B, of the portion 810 of the frame 800. The normalized slices 820 are combined into a new image and filtered to remove stray pixels and other noise that may be captured by the image sensor 380. For example, multiple lights and/or shadows may create low intensity pixels at locations on the surface of the shaft that are not at the location of the o-ring 430. As shown in FIG. 24B, the resulting filtered image 850 includes a large area of white (high intensity) that corresponds to the surface of the shaft of the suspension component as well as a plurality of black pixels that should correspond to the edges of the o-ring 430. Program 325 analyzes the filtered image 850 to find the edges for any objects in the filtered image 850. At least some of these edges should correspond to the edges seen at the perimeter of the o-ring 430. Program 325 then analyzes the detected edges to find all substantially vertical lines formed by the edges and selects the median vertical line position as the likely location of the o-ring 430.

The above described technique for finding the likely location of the o-ring 430 includes a number of processing steps that may take time in some simple devices 50. In some embodiments, processing may be reduced by relying on a simpler technique that doesn't attempt to filter out noise and irregularities in the captured portion 810 of the frame 800. Although not as reliable as the technique described above, this alternative technique is less computationally intensive. In an alternative embodiment, program 325 sums the intensity values for pixels in each column of pixels for the portion 810 of the original captured frame 800 to generate a single row of intensity sums for each column. The column of pixels associated with the lowest total intensity sum is then selected as the likely location of the o-ring 430. In other words, the column of pixels in portion 810 having the lowest average intensity value is selected as the likely location of the o-ring 430.

Figure 25A:
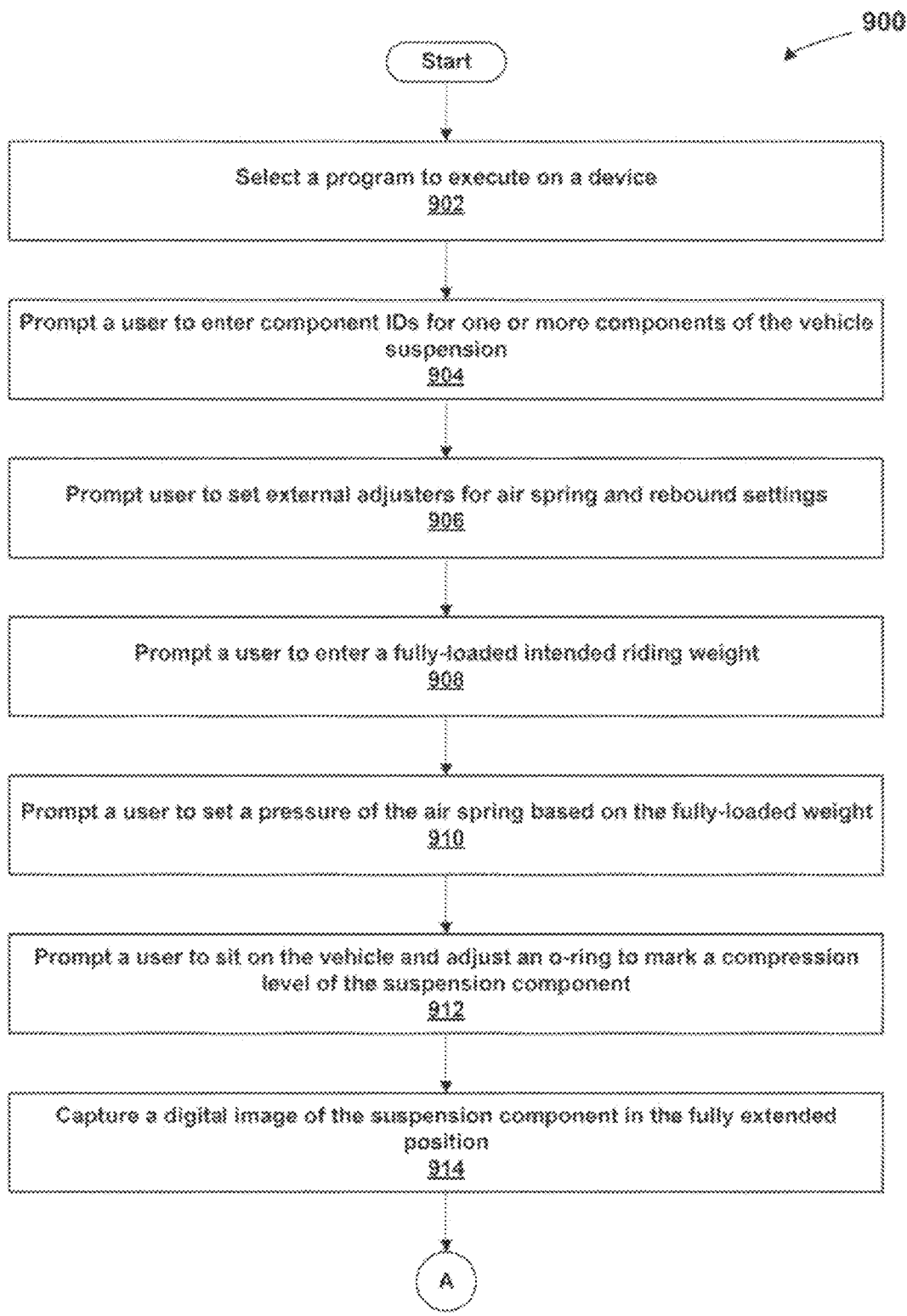
FIGS. 25A and 25B set forth flow diagrams of method steps for assisting a user in performing a setup routine, according to one embodiment.
Figure 25B:
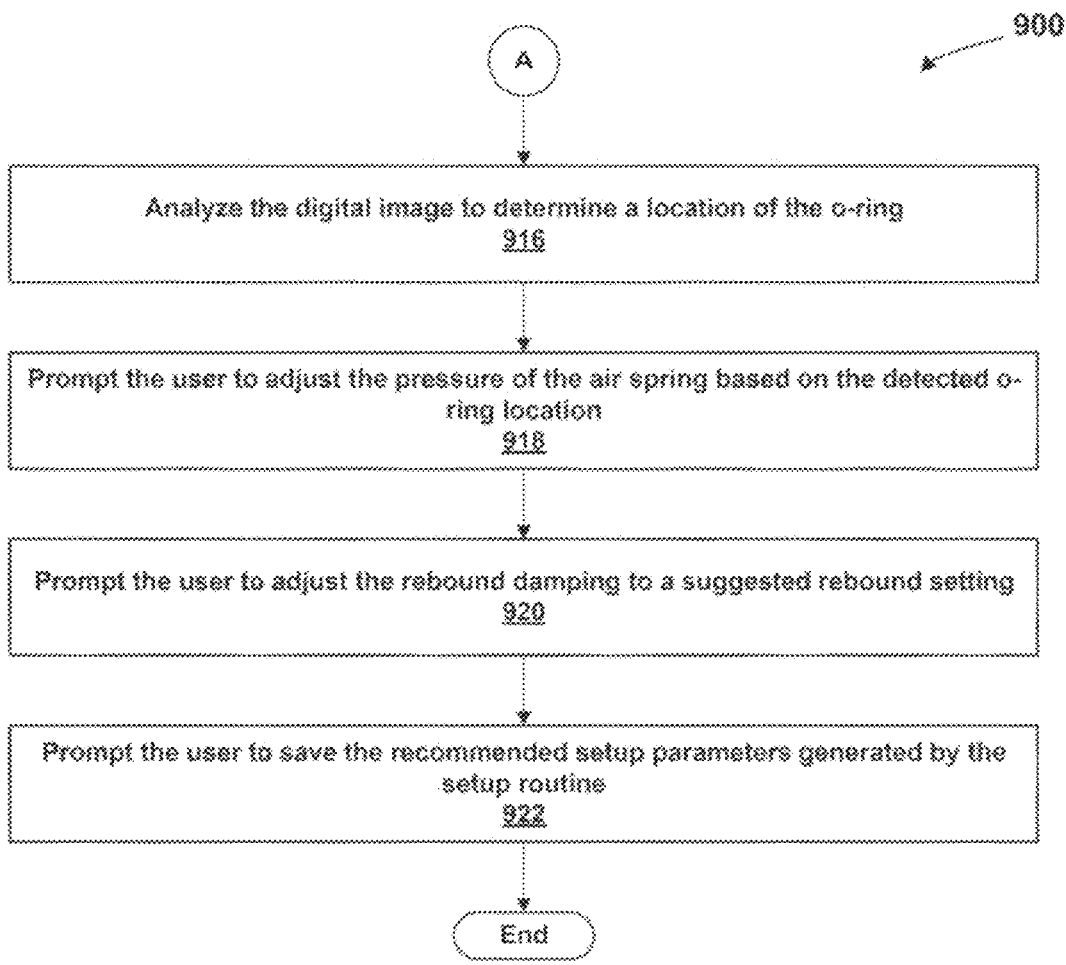

FIGS. 25A and 25B set forth flow diagrams of method steps for assisting a user in performing a setup routine, according to one embodiment. Although the method steps are described in conjunction with the systems of FIGS. 1-24B, persons of ordinary skill in the art will understand that any system configured to perform the method steps, in any order, is within the scope of the present invention.

As shown, a method 900 begins at step 902, where processor 310 executes program 325 on device 50. Program 325 displays a GUI 400 on display 350. At step 904, program 325 prompts a user to enter one or more component IDs that identify the suspension components installed on the vehicle 100. Component IDs may be typed into a user interface element in GUI 400 or scanned in automatically using an image sensor 380. Program 325 may check a database, stored locally or remotely, to determine whether the component IDs match a particular suspension product stored in the database. Program 325 may then retrieve product information associated with the suspension product specified by the component IDs. At step 906, program 325 prompts a user to set external adjusters for the air spring and rebound settings of the suspension component, as applicable. For example, program 325 may display instructions as text in a GUI 400, as shown in screen shot 400e At step 908, program 325 prompts a user to enter a fully-loaded riding weight. In one embodiment, program 325 displays user interface elements as part of GUI 400 that enable a user to enter a fully-loaded riding weight, as shown in screen shots 400g and 400l. In another embodiment, program 325 may automatically read a fully-loaded riding weight by querying a load sensor on vehicle 100 when the user indicates that the vehicle has been fully-loaded. At step 910, program 325 prompts a user to set a pressure of the air spring in the suspension component based on the fully-loaded riding weight. In one embodiment, program 325 calculates a target air pressure for the air spring based on the fully-loaded riding weight entered in step 908 and one or more physical characteristic values associated with the suspension component that are retrieved from a database based on the component ID. Program 325 may display the target air pressure in a user interface element of GUI 400, as shown in screen shots 400g and 400l. At step 912, program 325 prompts a user to sit on the vehicle 100 and adjust an o-ring 430 to mark a compression level of the suspension component. In one embodiment, program 325 displays instructions through a series of textual and graphical elements in GUI 400, as shown in screen shots 400h and 400m. Once the o-ring 430 is adjusted, the user may dismount the vehicle 100 such that the o-ring remains at a location on the shaft of the suspension component and indicates the amount of compression of the suspension component when compressed by the fully-loaded riding weight.

At step 914, program 325 captures a digital image of the suspension component in an unloaded state (e.g., fully extended). A user may use an image sensor 380 to capture an image of the suspension component that is properly aligned and oriented relative to the device 50. In one embodiment, program 325 displays a graphical overlay on top of a live view captured by the image sensor 380 on display 350, as shown in screen shots 400i and 400n. At step 916, program 325 analyzes the digital image to determine a location of the o-ring 430. In one embodiment, program 325 analyzes the digital image using an object detection algorithm described below in conjunction with FIGS. 26A and 26B.

At step 918, program 325 prompts the user to adjust the pressure of the air spring based on the detected o-ring 430 location. At step 920, program 325 prompts the user to adjust the rebound damping setting to a suggested rebound setting. The rebound damping setting is calculated based on the adjusted pressure of the air spring. In one embodiment, program 325 may also prompt the user to adjust the compression damping setting to a suggested compression setting based on the adjusted pressure of the air spring. At step 922, program 325 prompts the user to save the recommended setup parameters generated by the setup routine. After the user is allowed to save the setup parameters, method 900 terminates.

Figure 26A:
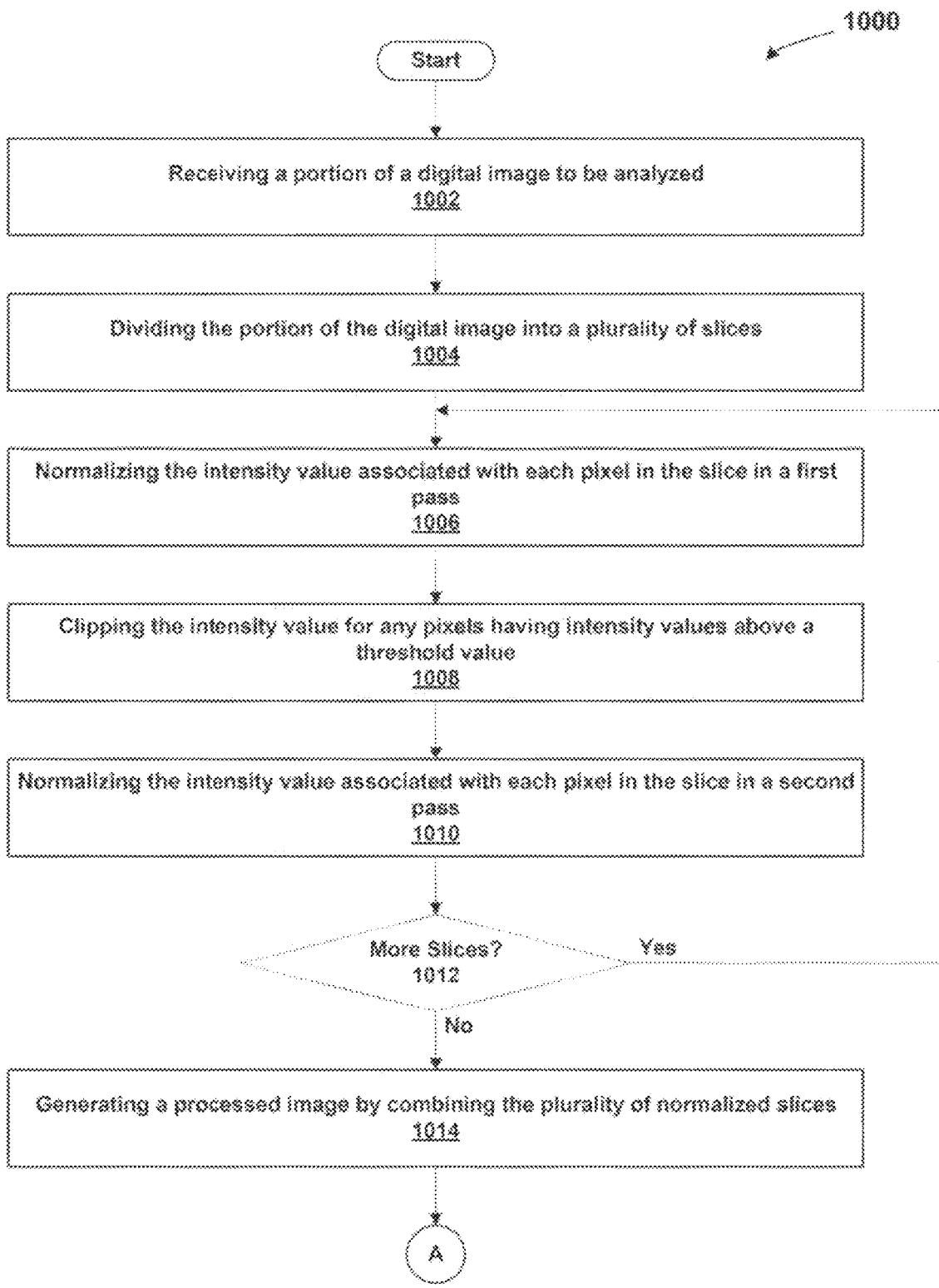
FIGS. 26A and 26B set forth flow diagrams of method steps for an object detection algorithm implemented by program, according to one embodiment.
Figure 26B:
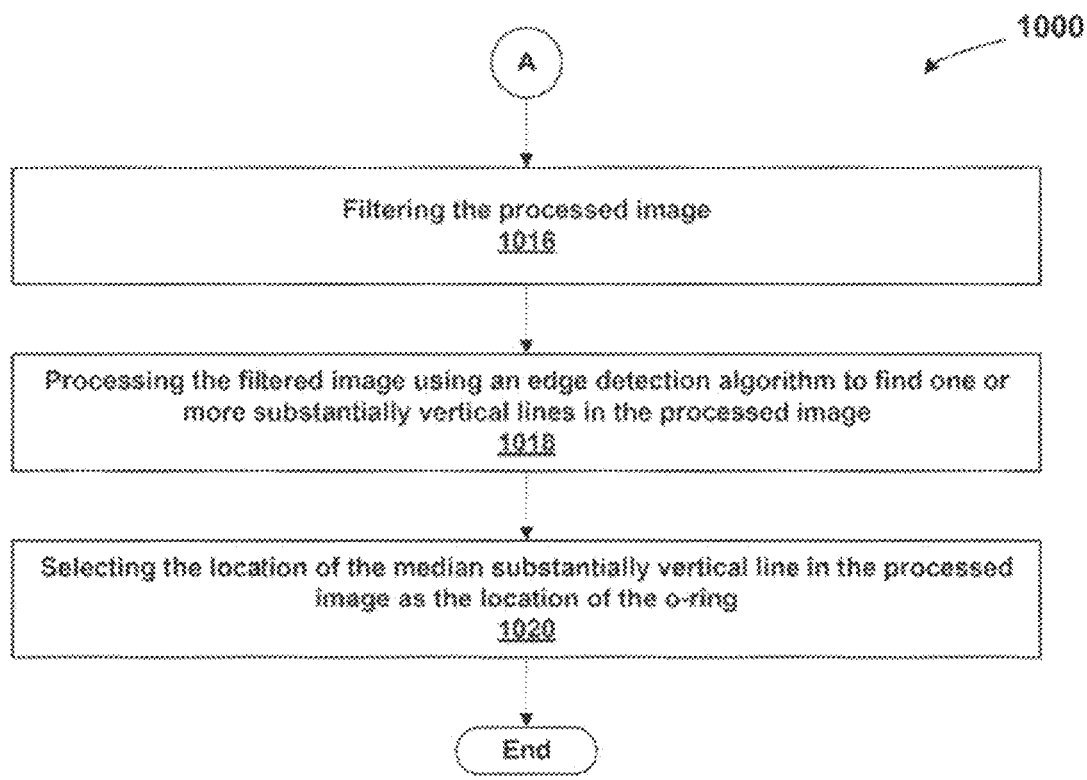

FIGS. 26A and 26B set forth flow diagrams of method steps for an object detection algorithm implemented by program 325, according to one embodiment. Although the method steps are described in conjunction with the systems of FIGS. 1-24B, persons of ordinary skill in the art will understand that any system configured to perform the method steps, in any order, is within the scope of the present invention.

As shown, a method 1000 begins at step 1002, where program 325 receives a portion 810 of a digital image 800 to be analyzed. In one embodiment, program 325 crops an image captured with image sensor 380 to generate a cropped image that should correspond to an image of the shaft of the suspension component and an o-ring 430. The extents of the portion 810 may be determined based on product information retrieved from the database using the component ID and specified in conjunction with the graphical overlay for the suspension component. At step 1004, program 325 divides the portion 810 of the digital image into a plurality of slices 820. In one embodiment, each slice 820 represents a row of pixels from the portion 810 of the digital image 800.

For each slice, at step 1006, program 325 normalizes the intensity value associated with each pixel of the slice 820 during a first pass. At step 1008, program 325 clips the intensity value for any pixels having an intensity value above a threshold value. At step 1010, program 325 normalizes the intensity value associated with each pixel in the slice 820 during a second pass. At step 1012, program 325 determines whether more slices 820 need to be processed. If more slices 820 need to be processed, then method 1000 repeats steps 1006, 1008, and 1010 for the next slice 820. If all the slices 820 in the portion 810 of the digital image 800 have been processed, then, at step 1014, program 325 generates a processed image by combining the plurality of normalized slices 820 into a composite image corresponding to portion 810.

In one embodiment, at step 1016, program 325 filters the processed image. For example, program 325 may implement any technically feasible filtering algorithm to remove excess noise from the processed image such as by adjusting a pixels intensity value based on the intensity values of two or more proximate pixels. At step 1018, program 325 processes the filtered image using an edge detection algorithm to find one or more substantially vertical lines in the processed image, which may be any technically feasible edge detection algorithm commonly known to those of skill in the art. Program 325 uses the edge detection algorithm to determine the locations of one or more substantially vertical edges in the portion 810. At step 1020, program 325 selects the location of the median substantially vertical line in the processed image as the location of the o-ring 430. Program 325 may sort the plurality of substantially vertical edges by location and then select the median location associated with a substantially vertical edge.

In sum, a user may utilize a mobile device equipped with an image sensor, such as a smart-phone, tablet computer, or laptop, to assist the user in proper setup of a vehicle suspension. The device executes an application that prompts the user for input and instructs the user to perform a series of steps for adjusting the suspension components. The application may not communicate with sensors on the vehicle, or the application may communicate with various sensors located on the vehicle to provide feedback to the device during the setup routine. In one embodiment, the system analyzes a digital image of the suspension component to provide feedback to the application about a physical characteristic of the component, such as the amount of sag of the vehicle suspension when loaded. The application may use this feedback information to assist the user in further adjustment to the vehicle suspension While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

What is claimed is:

1. A non-transitory computer-readable storage medium including instructions that, when executed by a processor, cause the processor to perform steps for enabling initial set up of a suspension component of a vehicle, the steps comprising:
  receive a weight value that indicates a load to be carried by the vehicle;
  determine a target pressure for an air spring of the suspension component based on the weight value;
  measure a loaded position of the suspension component;
  determine an adjustment to the suspension component based on the loaded position and the target pressure;
  measure the loaded position of the suspension component by using the image sensor to capture a digital image of the suspension component in the loaded position;
  analyzing the digital image using a computer-implemented object recognition process to determine a location of an indicator member, such as an o-ring, on the suspension component and
  wherein said computer-implemented object recognition process further comprises instructions for performing the following steps:
    converting the portion of the digital image from a color format into a grayscale format before analyzing the portion to locate said indicator member.

2. The non-transitory computer-readable storage medium of claim 1 wherein said computer-implemented object recognition process comprises instructions for performing the following steps:
  cropping the digital image to generate a portion of the digital image, wherein the portion of the digital image comprises a plurality of pixels associated with a shaft of the suspension component and the indicator member;
  analyzing the portion of the digital image to determine a location of the indicator member on the suspension component; and
  providing an output indicating the loaded position of the suspension component based on the location of the indicator member.

3. The non-transitory computer-readable storage medium of claim 2 wherein said computer-implemented object recognition process further comprises instructions for performing the following steps:
  dividing the portion into a plurality of slices, wherein each slice comprises a row of pixels of the portion of the digital image, and each pixel is associated with an intensity value;
  for each slice in the plurality of slices, normalizing, in a first pass, the intensity value associated with each pixel in the slice, clipping the intensity value for any pixels having intensity values above a threshold value, and normalizing, in a second pass, the intensity value associated with each pixel in the slice;
  generating a processed image by combining the plurality of slices that have been normalized in the first pass, clipped, and normalized in the second pass;
  filtering the processed image;
  performing an edge detection algorithm to find one or more substantially vertical lines in the processed image; and selecting the location of the median substantially vertical line in the processed image as the location of the indicator member.

4. The non-transitory computer-readable storage medium of claim 1 wherein said computer-implemented object recognition process further comprises instructions for performing the following steps:
- for each column of pixels in the portion of the digital image, summing the intensity values for each pixel in the column to generate a column intensity sum; and
- selecting the location of the column associated with the minimum column intensity sum as the location of the indicator member.

5. The non-transitory computer-readable storage medium of claim 1 wherein the computer-executable instructions are configured to cause a user's device to perform the following steps:
- provide on a display, a graphical overlay associated with the suspension component, wherein the graphical overlay indicates an alignment and an orientation on a live picture viewed using the image sensor of the user's device; and
- capturing the digital image when a user indicates that the live picture of the suspension component matches the alignment and the orientation indicated by the graphical overlay.

6. The non-transitory computer-readable storage medium of claim 5 wherein the computer-executable instructions are configured to cause the user's device to perform the following steps:
- receive a component identifier associated with the suspension component; and
- query a database to retrieve product information about the suspension component, such as at least one of an air spring compression ratio, an air spring piston area, a negative spring length, a negative spring rate, and a top-out spring rate.

7. The non-transitory computer-readable storage medium of claim 6 wherein the target pressure is determined from a calculation based on the product information associated with the suspension component retrieved from the database.

8. The non-transitory computer-readable storage medium of claim 5 wherein the computer-executable instructions further comprise instructions for causing the user's device to determine a rebound damping setting of the suspension component.

9. The non-transitory computer-readable storage medium of claim 8 wherein the rebound damping setting is determined based on the adjustment determined for the suspension component.

10. The non-transitory computer-readable storage medium of claim 9 wherein the adjustment to the suspension component comprises a modified target pressure of the air spring.

* * * * *